United States Patent
Tanaka

(10) Patent No.: US 11,526,696 B2
(45) Date of Patent: Dec. 13, 2022

(54) MODEL MAINTENANCE DEVICE, PATTERN RECOGNITION SYSTEM, MODEL MAINTENANCE METHOD, AND COMPUTER PROGRAM PRODUCT

(71) Applicants: Kabushiki Kaisha Toshiba, Minato-ku (JP); Toshiba Digital Solutions Corporation, Kawasaki (JP)

(72) Inventor: Ryohei Tanaka, Kawasaki (JP)

(73) Assignees: Kabushiki Kaisha Toshiba, Tokyo (JP); Toshiba Digital Solutions Corporation, Kawasaki (JP)

(*) Notice: Subject to any disclaimer, the term of this patent is extended or adjusted under 35 U.S.C. 154(b) by 1133 days.

(21) Appl. No.: 16/125,042

(22) Filed: Sep. 7, 2018

(65) Prior Publication Data
US 2019/0164014 A1 May 30, 2019

(30) Foreign Application Priority Data
Nov. 28, 2017 (JP) .............................. JP2017-228245

(51) Int. Cl.
G06K 9/00 (2022.01)
G06K 9/62 (2022.01)
(Continued)

(52) U.S. Cl.
CPC ......... *G06K 9/6262* (2013.01); *G06K 9/6253* (2013.01); *G06K 9/6267* (2013.01); *G06N 20/00* (2019.01); *G06V 30/10* (2022.01)

(58) Field of Classification Search
CPC ...... G06N 20/00; G06N 3/0454; G06N 7/005; G06N 20/10; G06N 3/084; G06N 20/20; G06N 3/04; G06N 3/08; G06N 5/04; G06N 5/045; G06N 5/003; G06N 3/0445; G06N 3/082; G06N 3/0472; G06N 3/088; G06N 3/004; G06N 3/0481; G06N 5/022;
(Continued)

(56) References Cited

U.S. PATENT DOCUMENTS

| | | | | |
|---|---|---|---|---|
| 2011/0251989 A1* | 10/2011 | Kraaij | ................... | G06F 16/353 706/50 |
| 2012/0123978 A1* | 5/2012 | Toderice | ................ | G06V 20/41 706/12 |

FOREIGN PATENT DOCUMENTS

| | | |
|---|---|---|
| JP | 6-32087 | 4/1994 |
| JP | 2843167 | 1/1999 |

* cited by examiner

*Primary Examiner* — Alex Kok S Liew
(74) *Attorney, Agent, or Firm* — Maier & Maier, PLLC

(57) ABSTRACT

A model maintenance device according to an embodiment performs maintenance of a model for pattern recognition used in label estimation of target data for recognition. The model maintenance device includes a generating unit, an evaluating unit, and an updating determining unit. The generating unit generates a new model using learning data. The evaluating unit evaluates the performance of the new model using evaluation data classified into a first group, from among evaluation data classified into a plurality of groups, and calculates a first performance evaluation value; and evaluates performance of the new model using evaluation data classified into a second group, from among the evaluation data classified into a plurality of groups, and calculates a second performance evaluation value. Based on the first performance evaluation value and the second performance evaluation value, the updating determining unit determines whether or not the existing model should be updated with the new model.

19 Claims, 16 Drawing Sheets

(51) Int. Cl.
*G06N 20/00* (2019.01)
*G06V 30/10* (2022.01)

(58) Field of Classification Search
CPC ........ G06N 5/046; G06N 3/063; G06N 3/126; G06N 5/043; G06N 5/02; G06N 3/006; G06N 3/02; G06N 3/0427; G06N 3/049; G06N 5/027; G06N 99/00; G06N 5/025; G06N 5/048; G06N 7/02; G06T 2207/20081; G06T 7/0012; G06T 2207/10132; G06T 7/11
See application file for complete search history.

MODEL MAINTENANCE DEVICE, PATTERN RECOGNITION SYSTEM, MODEL MAINTENANCE METHOD, AND COMPUTER PROGRAM PRODUCT

CROSS-REFERENCE TO RELATED APPLICATIONS

This application is based upon and claims the benefit of priority from Japanese Patent Application No. 2017-228245, filed on Nov. 28, 2017; the entire contents of which are incorporated herein by reference.

FIELD

Embodiments described herein relate generally to a model maintenance device, a pattern recognition system, a model maintenance method, and a computer program product.

BACKGROUND

In a pattern recognition system represented by an image recognition system or a speech recognition system; target data for recognition such as an image or a speech is treated as input, a label for the target data for recognition is estimated using a model for pattern recognition, and the estimated label is output as the recognition result. If the model of the recognition system is to be updated with a newly-generated model, generally the performance of the new model is evaluated using a number of sets of evaluation data (an evaluation data set); and, if a higher performance evaluation value than the performance evaluation value of the existing model is obtained, then the existing model is updated with the new model.

However, if only a simplistic comparison of the performance evaluation values is done, there are times when the validness of updating the model cannot be properly determined. For example, if there is a user demand for accurate recognition of a particular type of data, it is not desirable that the recognition rate with respect to the particular type of data undergoes a decline due to the updating of the model. However, there can be times when, even if the performance evaluation value of the new model is higher than the performance evaluation value of the existing model, there is a decline in the recognition rate with respect to the particular type of data. In such a case, in the conventional technology, the existing model gets updated with the new model, and thus the user demand cannot be catered to.

DETAILED DESCRIPTION

Figure 1:
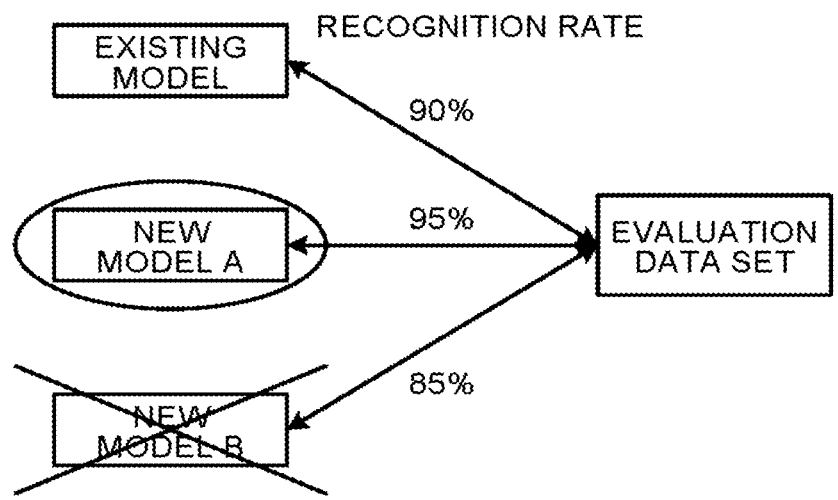
FIG. 1 is a diagram for explaining a conventional method for performing determination about model updating.

A model maintenance device according to embodiments performs maintenance of a model for pattern recognition used in label estimation of the target data for recognition. The model maintenance device includes a generating unit, an evaluating unit, and an updating determining unit. The generating unit generates a new model using learning data. The evaluating unit evaluates the performance of the new model using evaluation data classified into a first group, from among evaluation data classified into a plurality of groups, and calculates a first performance evaluation value; and evaluates performance of the new model using evaluation data classified into a second group, from among the evaluation data classified into a plurality of groups, and calculates a second performance evaluation value. Based on the first performance evaluation value and the second performance evaluation value, the updating determining unit determines whether or not the existing model should be updated with the new model.

The embodiments of the model maintenance device, a pattern recognition system, a model maintenance method, and a computer program product are described below in detail with reference to the accompanying drawings.

BRIEF OVERVIEW OF EMBODIMENTS

The embodiments are related to the maintenance of a model for pattern recognition. The model represents information to be used in estimating the label of the target data for recognition in the pattern recognition system, and is generated by doing statistical learning with the use of a number of sets of learning data (a learning data set). The format of the model differs according to the recognition algorithm. Meanwhile, the model is sometimes also called a classifier.

The target data for recognition represents data that is input as the recognition target in the pattern recognition system. For example, the target data for recognition that is input in an image recognition system is image data, and the target data for recognition that is input in a speech recognition system is speech data. Moreover, the label is estimated using the model in the pattern recognition system, and represents the data to be output. For example, in an image recognition system meant for performing character recognition, the label that is output represents a character code. Similarly, in a speech recognition system meant for performing face recognition, the label that is output represents a person ID.

Regarding the learning (generation) of the model, supervised data having a correct label assigned thereto is mainly used. However, unsupervised data not having a correct label assigned thereto can also be included in learning data; and learning (generation) of the model can be done using semi-supervised data too.

The maintenance of a model implies a series of operations including generating a new model using the learning data set, and updating the existing model with the new model as may be necessary. The learning data set can be expanded by adding thereto, as learning data, the target data for recognition for which the label has been estimated in the pattern recognition system. In order to determine whether or not the existing model should be updated with the new model, the performance of the new model is evaluated using a number of sets of evaluation data (an evaluation data set). Herein, the evaluation data represents supervised data having a correct label assigned thereto, and is also sometimes called validation data.

The evaluation data can be selected for use from a data set of supervised data. Then, the remaining data in the data set as well as the target data for recognition for which the label has been estimated in the pattern recognition system can be used as the learning data. Meanwhile, with respect to the target data for recognition for which the label has been estimated in the pattern recognition system, if a correct label is assigned in response to a teaching operation performed by the user, then that target data for recognition can be used as evaluation data too.

FIG. 1 is a diagram for explaining a conventional method for performing determination about model updating. Conventionally, the performance of the new model is evaluated using an evaluation data set; and, if a higher performance evaluation value (herein, the recognition rate with respect to the evaluation data set) than the performance evaluation value of the existing model is obtained, the existing model is updated with the new model. In the example illustrated in FIG. 1, regarding a new model A, the recognition rate with respect to the evaluation data set is 95% that is higher than the recognition rate of 90% of the existing model with respect to the evaluation data set. Hence, the existing model gets updated with the new model A. In contrast, as in the case of a new model B, when the recognition rate with respect to the evaluation data set is lower than the recognition rate of the existing mode (in the example illustrated in FIG. 1, the new model B has the recognition rate of 85% that is lower than the recognition rate of 80% of the existing model), the existing model is not updated.

However, in such a conventional method, the issue is that the performance with respect to a particular type of data cannot be guaranteed. That is, even if the recognition rate of the new model with respect to the evaluation data set is higher than the recognition rate of the existing model, there is no guarantee that the recognition rate with respect to the particular type of data has not declined and there are times when the particular type of data cannot be accurately recognized as a result of updating the model. Particularly, in the case of a system in which the target data for recognition for which the label has been estimated is added as learning data thereby resulting in the expansion of the learning data set, there are times when the label of the learning data is not correct and there is a high risk of a decline in the performance of the new model.

Figure 2:
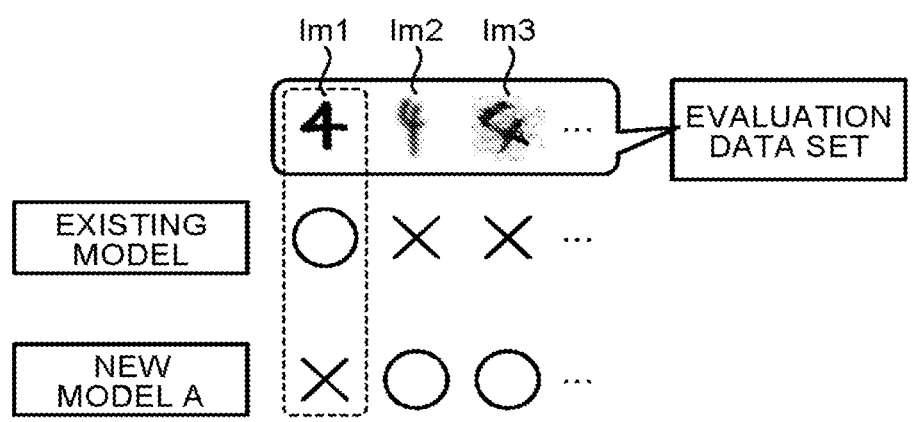
FIG. 2 is a diagram for explaining the issues faced in the conventional method.

FIG. 2 is a diagram for explaining the issues faced in the conventional method. For example, as far as image recognition is concerned, it is often considered practically important to be able to correctly recognize the images in which the target is clearly visible as compared to the images in which recognition is difficult, such as images in which the target is blurred or images in which some part of the target is missing. However, in the conventional method, even if there is a decline in the recognition rate of the practically important images, as long as the overall recognition accuracy is enhanced, it is determined that the performance is enhanced. For example, in the example illustrated in FIG. 2, in an image Im1 included in the evaluation data set, the character is relatively clearly visible and is thus a practically important image. On the other hand, images Im2 and Im3 are images in which the recognition is relatively difficult. Herein, assume that the existing model is able to correctly recognize the image Im1 but cannot correctly recognize the images Im2 and Im3. On the other hand, assume that the new model A is able to correctly recognize the images Im2 and Im3 but cannot correctly recognize the image Im1. In that case, regardless of the fact that the new model A cannot recognize the practically important image Im1, there are times when the recognition rate of the new model A with respect to the overall evaluation data set is higher than the recognition rate of the existing model. Hence, if the existing model is updated with the new model A, there is a concern that the recognition rate of the practically important image undergoes a decline. Moreover, as described above, the same issue is faced even in the case of a user demand for accurate recognition of a particular type of data.

In that regard, in the embodiments, the evaluation data included in the evaluation data set is classified into a plurality of groups; the performance of the new model is evaluated using the evaluation data classified into the first group and a first performance evaluation value is calculated; and the performance of the new model is evaluated using the evaluation data classified into the second group and a second performance evaluation value is calculated. Then, based on the first performance evaluation value and the second performance evaluation value, it is determined whether or not the existing model should be updated with the new model. For example, the evaluation data classified into the first group is treated as a particular type of data, and the evaluation data classified into the second group is treated as data other than the particular type of data. If the first performance evaluation value of the new model is equal to or greater than a first threshold value and if the second performance evaluation value the new model is equal to or greater than a second threshold value, then it is determined that the existing model should be updated with the new model.

Figure 3:
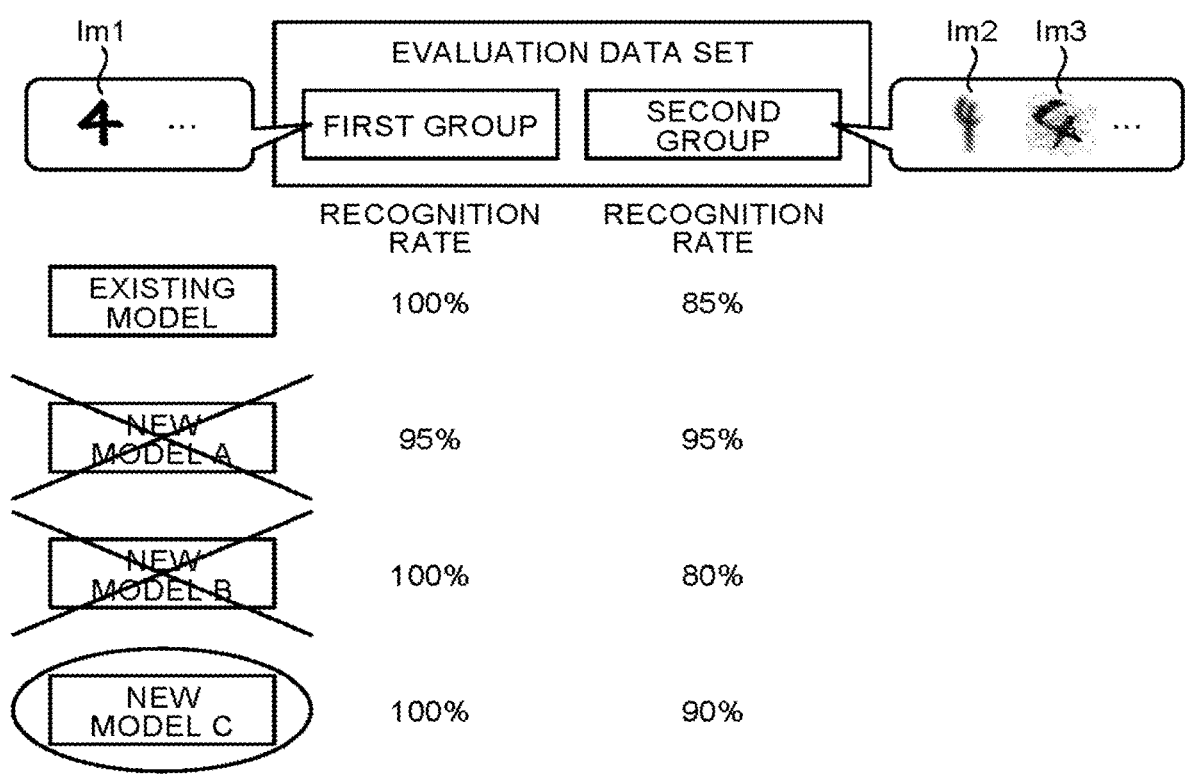
FIG. 3 is a diagram for explaining brief overview of embodiments.

FIG. 3 is a diagram for explaining a brief overview of the embodiments with reference to the examples illustrated in FIGS. 1 and 2. In the embodiments, the evaluation data included in the evaluation data set is, for example, classified into a first group of practically important data, that is, a particular type of data such as the data for which the user has demanded accurate recognition, and into a second group of other data rather than the particular type of data. For example, the image Im1 illustrated in FIG. 2 is classified into the first group, and the images Im2 and Im3 illustrated in FIG. 2 are classified into the second group. Then, as far as the performance evaluation of the new model is concerned, the performance evaluation of the new model using the evaluation data classified into the first group is separately performed from the performance evaluation of the new model using the evaluation data classified into the second group; and, if the first performance evaluation value (herein, the recognition rate with respect to the evaluation data classified into the first group) is equal to or greater than a first threshold value and if the second performance evaluation value (herein, the recognition rate with respect to the evaluation data classified into the second group) is equal to or greater than a second threshold value, it is determined that the existing model should be updated with the new model. As far as the first threshold value is concerned, for example, a predetermined fixed threshold value (such as the recognition rate of 100%) is used. Moreover, as far as the second threshold value is concerned, for example, the second performance evaluation value calculated for the existing model is used.

In the example illustrated in FIG. 3, the second performance evaluation value of the new model A (i.e., the recognition rate of the new model A with respect to the evaluation data classified into the second group) is equal to or greater than the second threshold value (i.e., the recognition rate of the existing model with respect to the evaluation data classified into the second group). However, the first performance evaluation value of the new model A (i.e., the recognition rate of the new model A with respect to the evaluation data classified into the first group) is smaller than the first threshold value (of 100%). Hence, it is determined that the existing model should not be updated with the new model A. Regarding the new model B, the first performance evaluation value is equal to or greater than the first threshold value but the second performance evaluation value is smaller than the second threshold value. Hence, it is determined that the existing model should not be updated with the new model B. Regarding a model C, the first performance evaluation value is equal to or greater than the first threshold value and the second performance evaluation value is equal to or greater than the second threshold value. Hence, it is determined than the existing model should be updated with the new model C.

In the embodiments, because of such a configuration, whether or not the existing model should be updated with the new model can be properly determined while ensuring that the overall recognition performance is enhanced without causing a decline in the recognition performance with respect to the particular type of data as a result of updating the model. Hence, maintenance can be done for the most suitable model that enables giving a performance guarantee with respect to the particular type of data. Given below is the detailed explanation of specific examples of a pattern recognition system in which the embodiments are applied. In the following explanation, the constituent elements having identical functions are referred to by the same reference numerals, and the redundant explanation is not repeated.

First Embodiment

Figure 4:
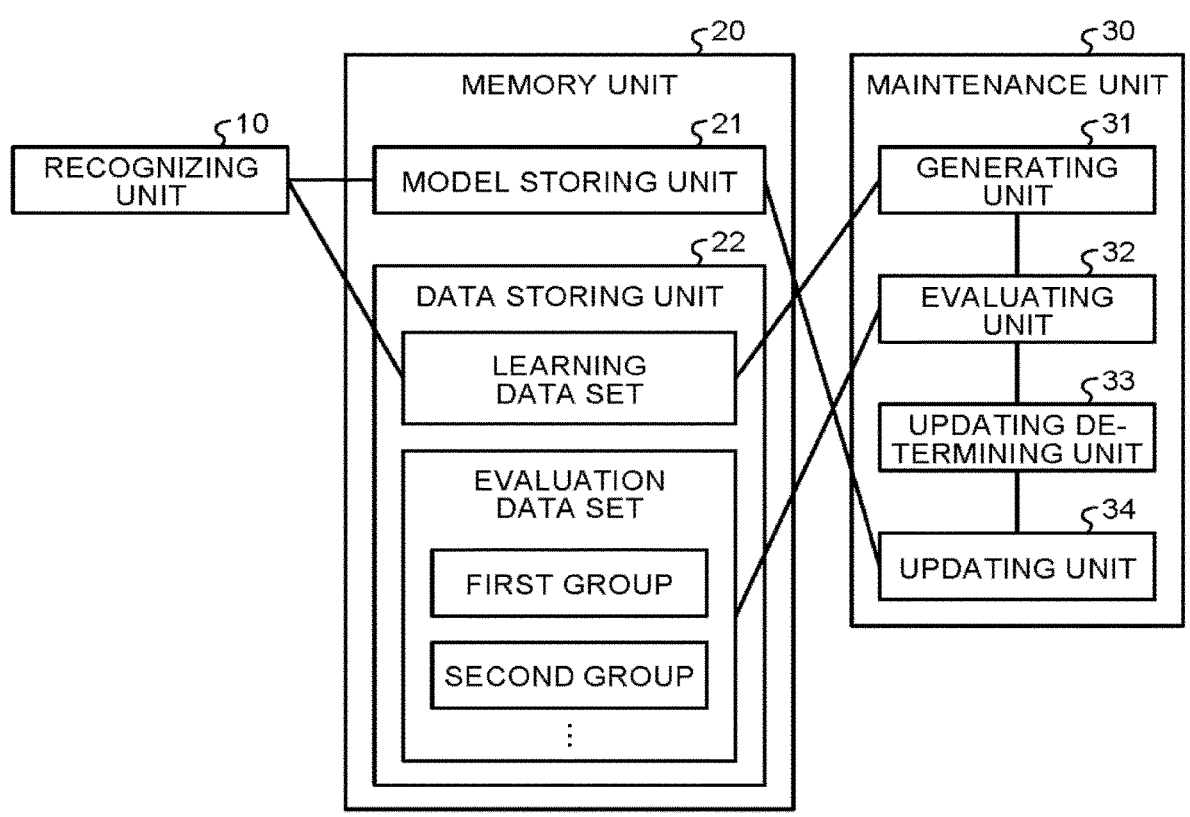
FIG. 4 is a block diagram illustrating an exemplary functional configuration of a pattern recognition system according to a first embodiment.

FIG. 4 is a block diagram illustrating an exemplary functional configuration of a pattern recognition system according to a first embodiment. As illustrated in FIG. 4, the pattern recognition system according to the first embodiment includes a recognizing unit 10, a memory unit 20, and a maintenance unit 30. The maintenance unit 30 is equivalent to a model maintenance device.

The recognizing unit 10 uses the existing model stored in the memory unit 20, and estimates the label of the target data for recognition input to the pattern recognition system. The label estimated by the recognizing unit 10 is output as the recognition result from the pattern recognition system.

The memory unit 20 includes a model storing unit 21 used in storing the existing model, and a data storing unit 22 used in storing a learning data set and an evaluation data set. As described earlier, the learning data set is a data set of learning data to be used for generating a recognition model, and can include not only supervised data having a correct label assigned thereto but also unsupervised data not having a correct label assigned thereto. As described above, the evaluation data set is a collection of evaluation data to be used for evaluating the performance of the model. The evaluation data included in the evaluation data set is classified into a plurality of groups.

The learning data and the evaluation data have an equivalent data format. Thus, from the data set of this format, some portion can be selected and treated as the evaluation data set, and the remaining portion can be treated as the learning data set. However, in order to correctly evaluate the performance of the model, the evaluation data needs to be supervised data. Meanwhile, the model storing unit 21 and the data storing unit 22 can be physically implemented using a single memory device or using a plurality of memory devices. That is, the memory unit 20 is configured using one or more memory devices.

The maintenance unit 30 represents the function of performing maintenance of models, and includes a generating unit 31, an evaluating unit 32, an updating determining unit 33, and an updating unit 34.

The generating unit 31 generates a new model using the learning data stored in the data storing unit 22. In the case of performing model initialisation, the generating unit 31 generates an initial model that is the initially-stored model in the model storing unit 21 at the time of building the pattern recognition system. The initialization can be performed at the time of renewing the pattern recognition system according to any changes in the objective, and an initial model can be generated and newly stored in the model storing unit 21.

The evaluating unit 32 uses the evaluation data stored in the data storing unit 22, and evaluates the performance of the new model generated by the generating unit 31. Particularly, from the evaluation data classified into a plurality of groups, the evaluating unit 32 uses the evaluation data classified into the first group for evaluating the performance of the new model and calculates the first performance evaluation value; and uses the evaluation data classified into the second group for evaluating the performance of the new model and calculates the second performance evaluation value. The first performance evaluation value can be the recognition rate with respect to the evaluation data classified into the first group. Alternatively, for example, the first performance evaluation value can be some other value representing the recognition performance with respect to the evaluation data classified into the first group, such as a value calculated by weighting particular evaluation data within the first group. In an identical manner, the second performance evaluation value can be the recognition rate with respect to the evaluation data classified into the second group. Alternatively, for example, the second performance evaluation value can be some other value representing the recognition performance with respect to the evaluation data classified into the second group, such as a value calculated by weighting particular evaluation data within the second group. Meanwhile, in the case of initializing the model, the evaluating unit 33 evaluates the performance of the initial model in an identical manner to the evaluation of the performance of a new model, and calculates the first performance evaluation value and the second performance evaluation value of the initial model.

Based on the first performance evaluation value and the second performance evaluation value, the updating determining unit 33 determines whether or not the existing model should be updated with the new model. For example, if the first performance evaluation value of the new model is equal to or greater than a first threshold value and if the second performance evaluation value of the new model is equal to or greater than a second threshold value, then the updating determining unit 33 determines that the existing model should be updated with the new model. For example, the first threshold value is set in advance as a fixed threshold value, for example. Alternatively, the first threshold value can be set to be variable according to the input operations of the user. The second threshold value is, for example, the second performance evaluation value of the existing model, and is calculated and stored at the time of generation of the existing model. The second threshold value is a relative threshold value that changes when the model gets updated.

When the updating determining unit 33 determines that the model should be updated, the updating unit 34 updates the existing model, which is stored in the model storing unit 21, with the new model. That is, when the first performance evaluation value is equal to or greater than the first threshold value and when the second performance evaluation value is equal to or greater than the second threshold value, the updating unit 34 updates the existing model with the new model. Meanwhile, the updating unit 34 is not limited to automatically updating the model according to the determination result of the updating determining unit 33, and alternatively can be configured to update the model in response to an updating instruction issued by the user. That is, the configuration can be such that, when the updating determining unit 33 determines that the model should be updated, the updating unit 34 inquires the user about whether or not to update the existing model with the new model; and, if an updating instruction is received from the user, updates the existing model with the new model.

Given below is the specific explanation of the operations performed in the pattern recognition system according to the first embodiment in the order of model initialization, model-based pattern recognition, and model maintenance.

Firstly, the explanation is given about the model initialization. In the first embodiment, as the preparation for model initialization, it is assumed that the evaluation data is selected and classified and that the first threshold value is set. That is, before building the pattern recognition system, plenty of supervised data is provided. Then, the data set of supervised data is divided into evaluation data and learning data according to, for example, random division of a predetermined ratio, and is stored in the data storing unit 22. At that time, the evaluation data is classified into a plurality of groups before being stored in the data storing unit 22, and the first threshold value is set. The classification of the evaluation data and the setting of the first threshold value are performed according to the judgement of the administrator, for example.

Figure 5:
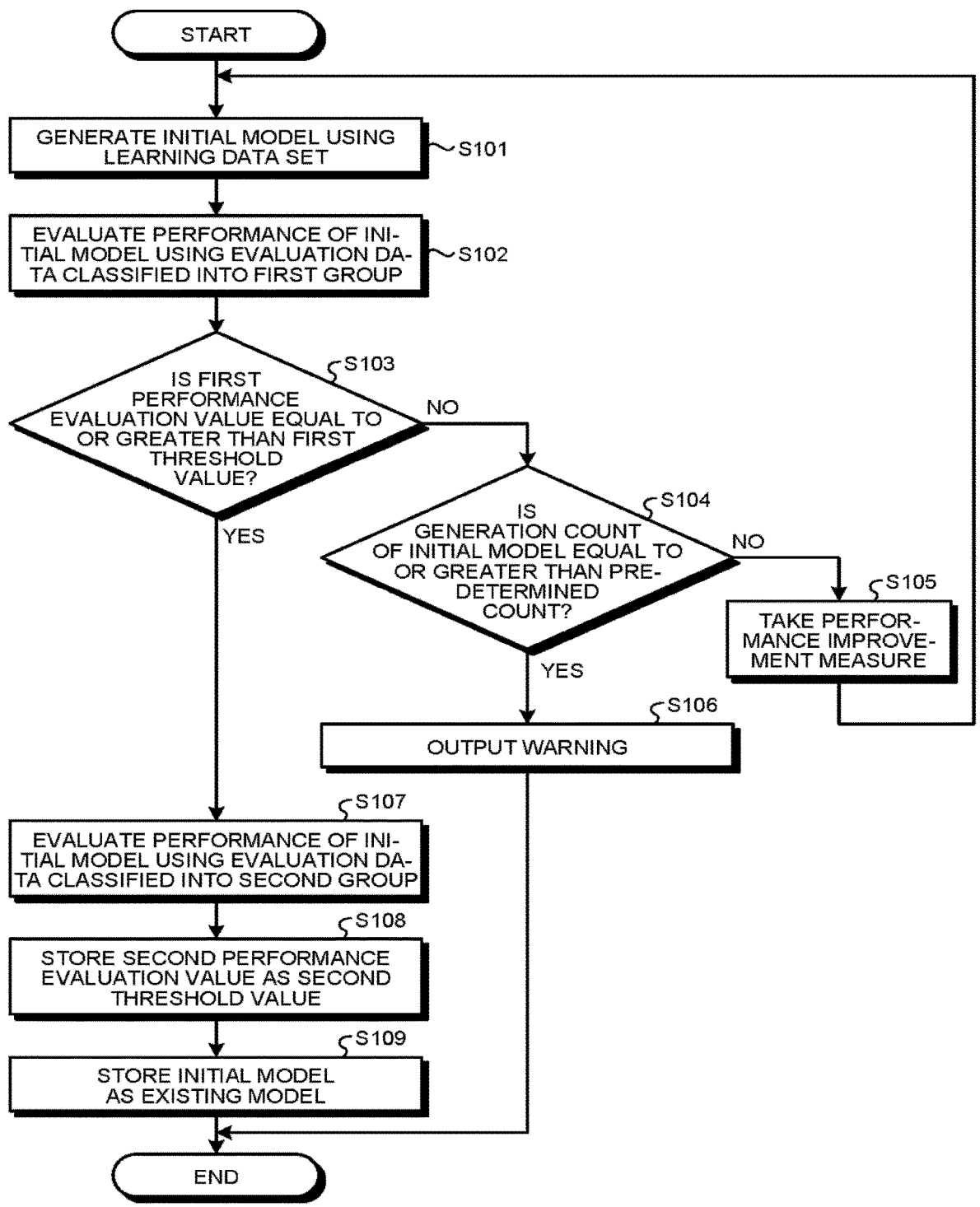
FIG. 5 is a flowchart for explaining a sequence of operations performed in model initialization.

FIG. 5 is a flowchart for explaining a sequence of operations performed in the model initialization. When the model initialization is started, firstly, the generating unit 31 uses the learning data set and generates the initial model according to a predetermined method (Step S101). Herein, the predetermined method is in accordance with the recognition method of the pattern recognition system, and examples of the predetermined method include a support vector machine, a neural network, and a subspace method.

Then, the evaluating unit 32 evaluates the performance of e initial model using the evaluation data classified into the first group from among the evaluation data set, and calculates the first performance evaluation value (Step S102). Then, it is determined whether or not the first performance evaluation value is equal to or greater than a first threshold value (Step S103). If the first performance evaluation value is smaller than the first threshold value (No at Step S103), it is further determined if the initial model has been generated for a predetermined number of times or more (Step S104). If the generation count of the initial model is smaller than the predetermined count (No at Step S104), then a performance improvement measure is taken for enabling correct recognition of the incorrectly-recognized evaluation data (Step S105). Then, the system control returns to Step S101 and the initial model is again generated. The performance improvement measure implies adding a copy of the incorrectly-recognized evaluation data or a modified version of the incorrectly-recognized evaluation data to the evaluation data set, or implies increasing the weight of such learning data in the learning data set which is most similar to the incorrectly-recognized evaluation data.

Meanwhile, if the generation count of the initial model is equal to or greater than the predetermined count (Yes at Step S104), that is, if the first performance evaluation value does not become equal to or greater than the first threshold value even if the initial model is repeatedly generated for a predetermined number of times, then a warning is issued indicating that an initial model for enabling correct recognition of the evaluation data classified into the first group cannot be created (Step S106). It marks the end of the initialization operation. In that case, for example, the administrator revises the classification of the evaluation data and the first threshold value; takes measures such as transferring the incorrectly-recognized evaluation data from the first group to the second group and lowering the first threshold value; and again performs model initialization.

When the first performance evaluation value calculated with respect to the initial model is equal to or greater than the first threshold value (Yes at Step S103), the evaluating unit 32 evaluates the performance of the initial model using the evaluation data classified into the second group from among the evaluation data set, and calculates the second performance evaluation value (Step S107). The second performance evaluation value calculated by the evaluating unit 32 gets stored as a second threshold value (Step S108), and the initial model gets stored as the existing model in the model storing unit 21 (Step S109). It marks the end of the initialization operation.

Figure 6:
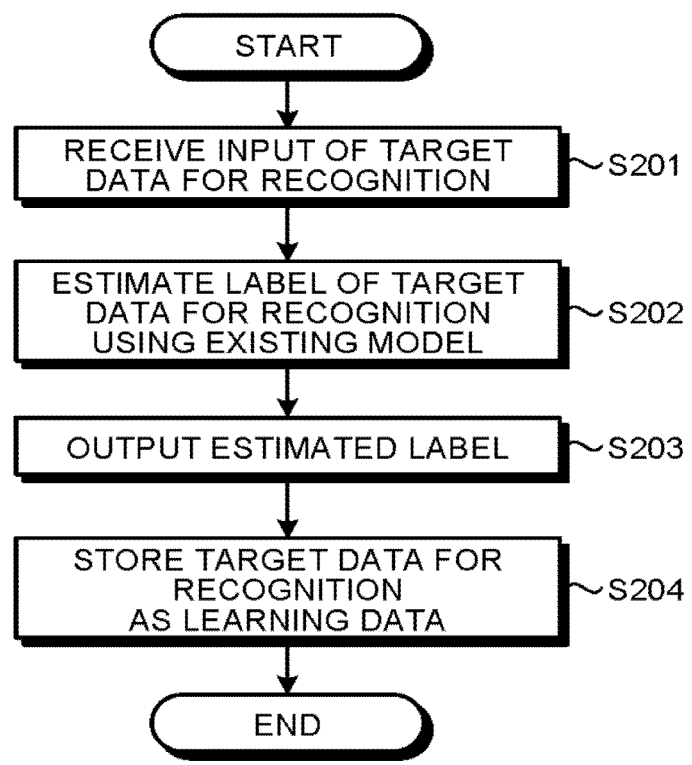
FIG. 6 is a flowchart for explaining a sequence of operations performed in pattern recognition.

Given below is the explanation of model-based pattern recognition. FIG. 6 is a flowchart for explaining a sequence of operations performed in the model-based pattern recognition. The series of operations illustrated in FIG. are repeatedly performed every time the target data for recognition is input to the pattern recognition system.

When the pattern recognition system receives input of the target data for recognition (Step S201), the recognizing unit 10 uses the existing model stored in the model storing unit 21 and estimates the label of the target data for recognition (Step S202). Then, the label of the target data for recognition as estimated by the recognizing unit 10 is output as the recognition result from the pattern recognition system (Step S203). Moreover, the target data for recognition, for which the label has been estimated by the recognizing unit 10, is stored as learning data in the data storing unit 22 (Step S204).

Figure 7:
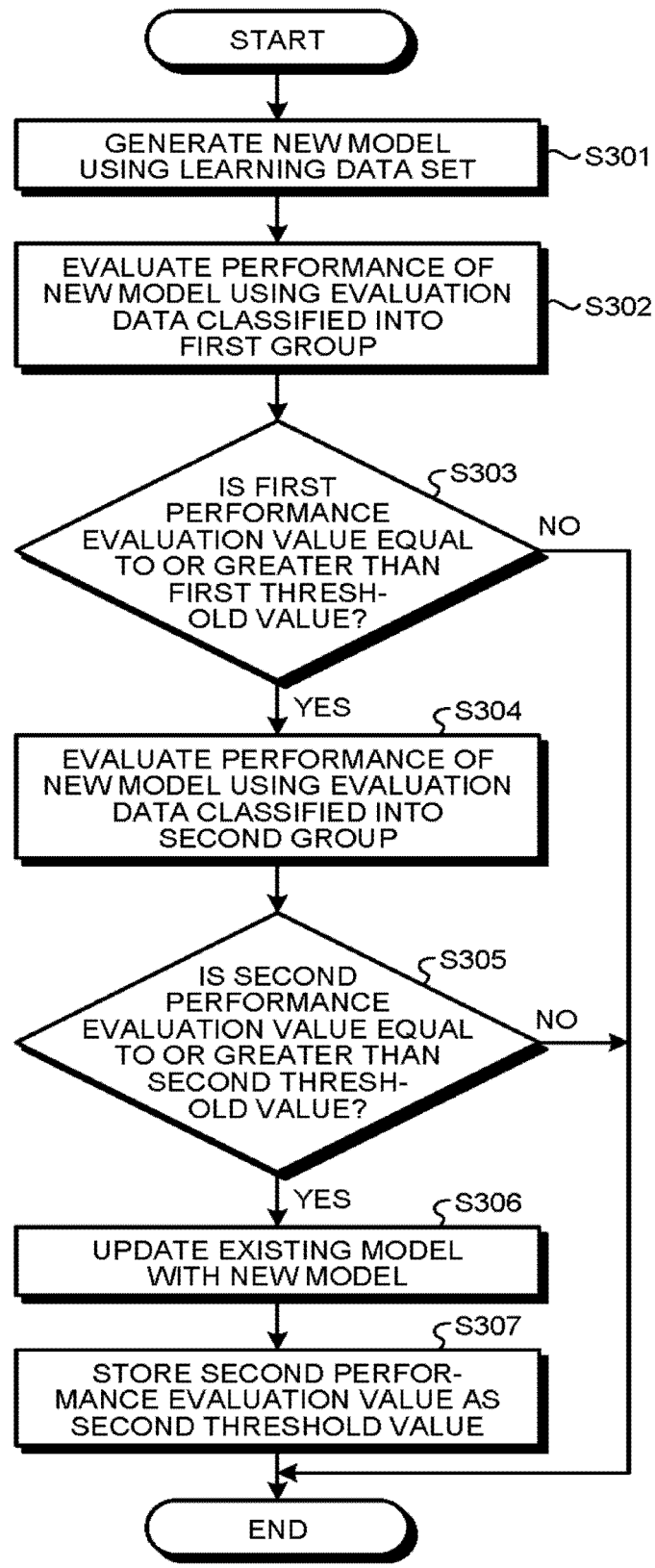
FIG. 7 is a flowchart for explaining a sequence of operations performed in model maintenance.

Given below is the explanation about model maintenance. FIG. 7 is a flowchart for explaining a sequence of operations performed in the model maintenance. The series of operations illustrated in FIG. 7 are performed at a predetermined timing such as once a day.

When the model maintenance is started, firstly, the generating unit 31 uses the learning data set and generates a new model according to the method identical to the method implemented for generating the initial model (Step S301). The learning data set used in generating the new model contains, as the learning data, the target data for recognition for which the label has been estimated by the recognizing unit 10 using the existing model. Although the correct label of that learning data is not known, the learning of the new model is performed by, for example, treating the label estimated by the recognizing unit 10 as the correct label. Meanwhile, depending on the certainty factor of the recognition result (i.e., the certainty factor about the estimated label being the correct label), only some portion of the target data for recognition can be used as the learning data.

Then, the evaluating unit 32 evaluates the performance of the new model using the evaluation data classified into the first group from among the evaluation data set, and calculates the first performance evaluation value (Step S302). Subsequently, it is determined whether or not the first performance evaluation value is equal to or greater than the first threshold value (Step S303). If the first performance evaluation value is smaller than the first threshold value (No at Step S303), then the updating determining unit 33 determines that the existing model should not be updated with the new model. In that case, the new model is discarded and the model maintenance is ended.

When the first performance evaluation value is equal to or greater than the first threshold value (Yes at Step S303), the evaluating unit 32 evaluates the performance of the new model using the evaluation data classified into the second group from among the evaluation data set, and calculates the second performance evaluation value (Step S304). Then, it is determined whether or not the second performance evaluation value is equal to or greater than the second threshold value (Step S305). If the second performance evaluation value is smaller than the second threshold value (No at Step S305), then the updating determining unit 3 determines that the existing model should not be updated with the new model. In that case, the new model is discarded and the model maintenance is ended.

When the second performance evaluation value is equal to or greater than the second threshold value (Yes at Step S305), the updating determining unit. 33 determines that the existing model should be updated with the new model. In that case, the updating unit 34 updates the existing model with the new model (Step S306); and stores the second performance evaluation value, which is calculated at Step S304, as the second threshold value (Step S307). It marks the end of the model maintenance.

As described above with reference to specific examples, during the model maintenance performed in the pattern recognition system according to the first embodiment, the first performance evaluation value is calculated by evaluating a new model using the evaluation data classified into the first group from among the evaluation data classified into a plurality of groups, as well as the evaluation data to be classified into the second group is calculated. Then, if the first performance evaluation value is equal to or greater than the first threshold value and if the second performance evaluation value is equal to or greater than the second threshold value, it is determined that the existing model should be updated with the new model and accordingly the existing model is updated. Thus, whether or not the existing model should be updated with the new model can be properly determined while ensuring that the overall recognition performance is enhanced without causing a decline in the recognition performance with respect to the particular type of data as a result of updating the model.

Second Embodiment

Figure 8:
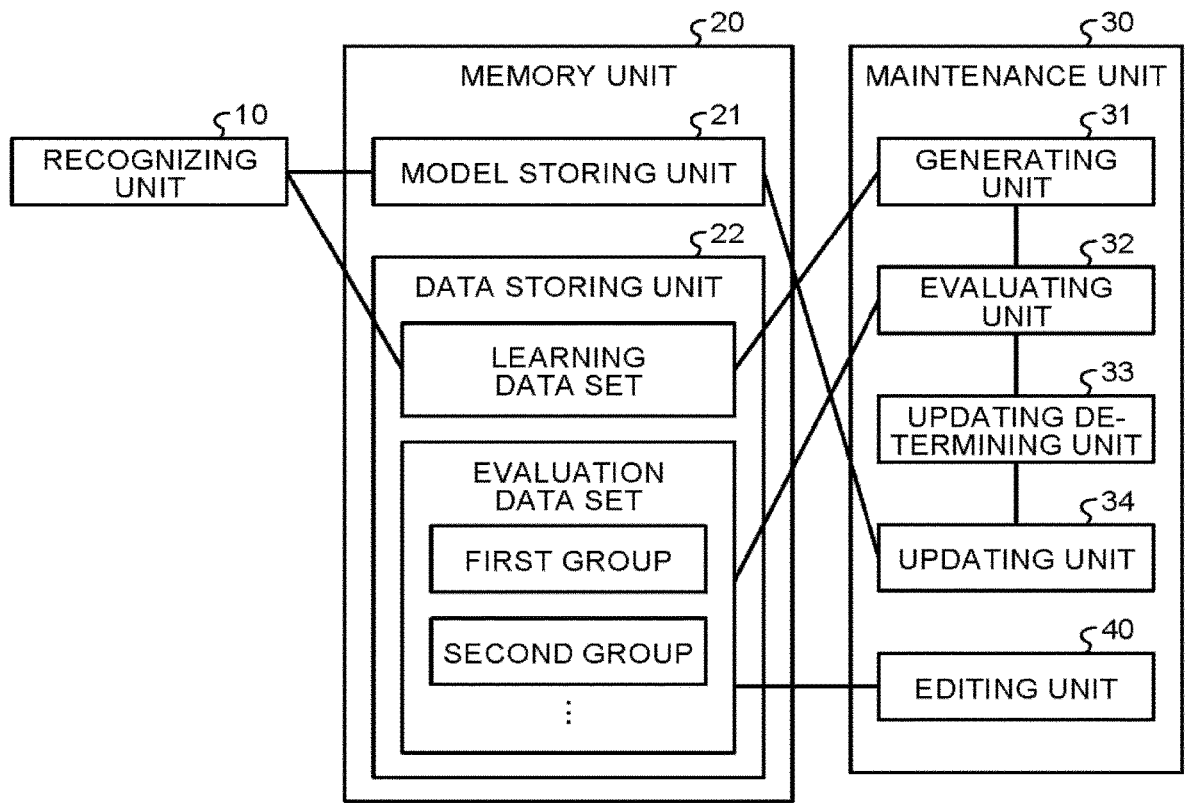
FIG. 8 is a block diagram illustrating an exemplary functional configuration of a pattern recognition system according to a second embodiment.

Given below is the explanation of a second embodiment. In the second embodiment, a function of editing the evaluation data is added. FIG. 8 is a block diagram illustrating an exemplary functional configuration of the pattern recognition system according to the second embodiment. As compared to the configuration according to the first embodiment as illustrated in FIG. 4, in the pattern recognition system according to the second embodiment, the maintenance unit 30 further includes an editing unit 40.

Figure 9:
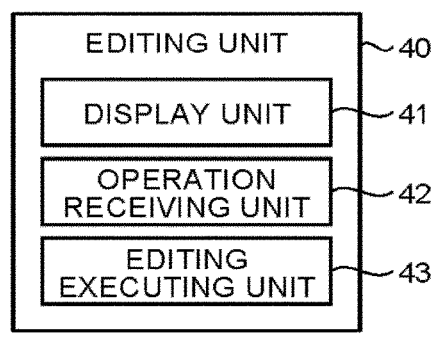
FIG. 9 is a block diagram illustrating the details of an editing unit.

The editing unit 40 adds evaluation data, deletes evaluation data, or performs group transfer of evaluation data in response to an editing operation of the user. In FIG. 9 are illustrated the details of the editing unit 40. As illustrated in FIG. 9, the editing unit 40 includes a display unit 41, an operation receiving unit 42, and an editing executing unit 43.

The display unit 41 performs control to display, in a display device, a variety of information that is useful for the user in performing an editing operation. The operation receiving unit 42 receives the editing operation performed by the user. In response to the editing operation of the as received by the operation receiving unit 42, the editing executing unit 43 performs evaluation data editing such as adding the evaluation data, deleting the evaluation data, or performing group transfer of the evaluation data.

Figure 10:
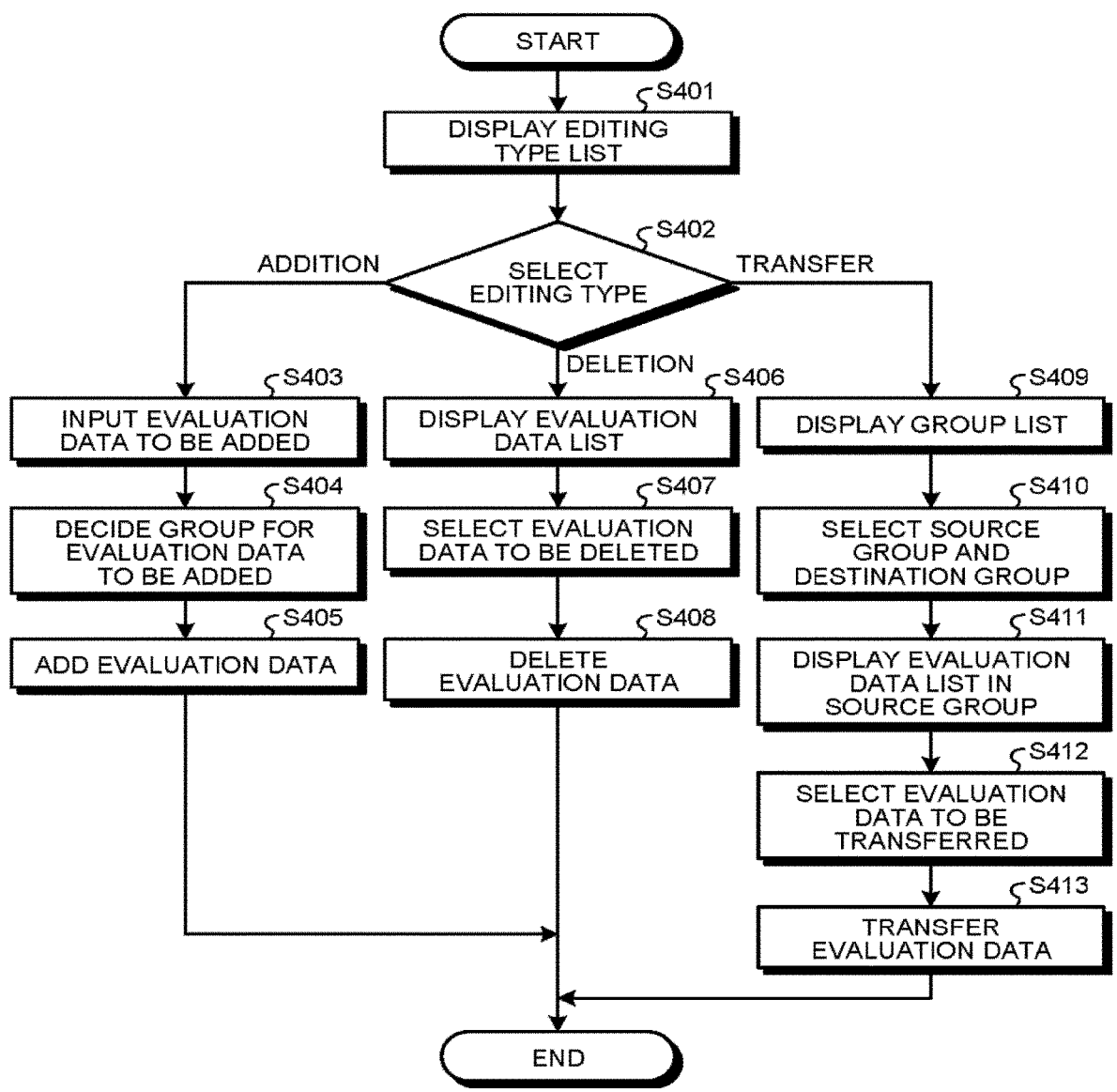
FIG. 10 is a flowchart for explaining a sequence of operations performed during the editing of evaluation data.

FIG. 10 is a flowchart for explaining a sequence of operations performed during the editing of evaluation data. For example, the editing of the evaluation data is performed in response to a user request in the case in which there is a change in the trend of the target data for recognition input to the pattern recognition system.

When the user requests for the editing of the evaluation data, the editing unit 40 is activated and, firstly, the display unit 41 performs control to display an editing type list (Step S401). The editing types include "addition", "deletion", and "transfer". When the user performs an operation of selecting an editing type from the editing type list (Step S402), the operation receiving unit 42 receives the selection operation, and the subsequent operations are branched according to the selected editing type.

When the "addition" is selected as the editing type, evaluation data to be added is input as a result of a user operation (Step S403). When the evaluation data is input, the editing executing unit 43 decides on the group of the input evaluation data (Step S404), and adds the input evaluation data as the evaluation data classified into the decided group (Step S405). The group to which the evaluation data is to be added can be decided according to the user operation or can be automatically decided by identifying the type of the evaluation data from its label.

When the "deletion" is selected as the editing type, an evaluation data list is displayed under the control of the display unit 41 (Step S406). Subsequently, when the user performs an operation to select the evaluation data for deletion from the evaluation data list (Step S407), the operation receiving unit 42 receives that operation and the editing executing unit 43 deletes the evaluation data selected by the user (Step S408).

When the "transfer" is selected as the editing type, a list of groups of evaluation data is displayed under the control of the display unit 41 (Step S409). When the user performs an operation of selecting the source group and the destination group from the list of groups (Step S410), the operation receiving unit 42 receives that operation and the evaluation data list in the source group is displayed under the control of the display unit 41 (Step S411). When the user performs an operation to select the evaluation data to be transferred from the evaluation data list (Step S412), the operation receiving unit 42 receives that operation and the editing executing unit 43 transfers the user-selected evaluation data from the source group to the destination group (Step S413).

When the evaluation data is edited, it is desirable that the performance of the existing model stored in the model storing unit 21 is re-evaluated using the edited evaluation data according to an identical sequence of operations to the sequence of operations in the initialization operation illustrated in FIG. 5. For example, if the editing of the evaluation data results in a change in the evaluation data classified into the first group, the operations identical to the operations from Step S102 onward illustrated in FIG. 5 are performed and the first performance evaluation value of the existing model is maintained to be equal to or greater than the first threshold value. Similarly, if the editing of the evaluation data results in a change in the evaluation data classified into the second group, the operations identical to the operations at Steps S107 and S108 illustrated in FIG. 5 are performed and the second threshold value is updated.

As described above, in the pattern recognition system according to the second embodiment, as a result of having the function of editing the evaluation data, in addition to become able to properly determine whether or not the existing model should be updated with the new model in an identical manner to the first embodiment, it also becomes possible to flexibly deal with the situation in which, for example, there is a change in the trend of the target data for recognition input to the pattern recognition system or there is a change in the type of the data for which the recognition performance is to be guaranteed.

Third Embodiment

Figure 11:
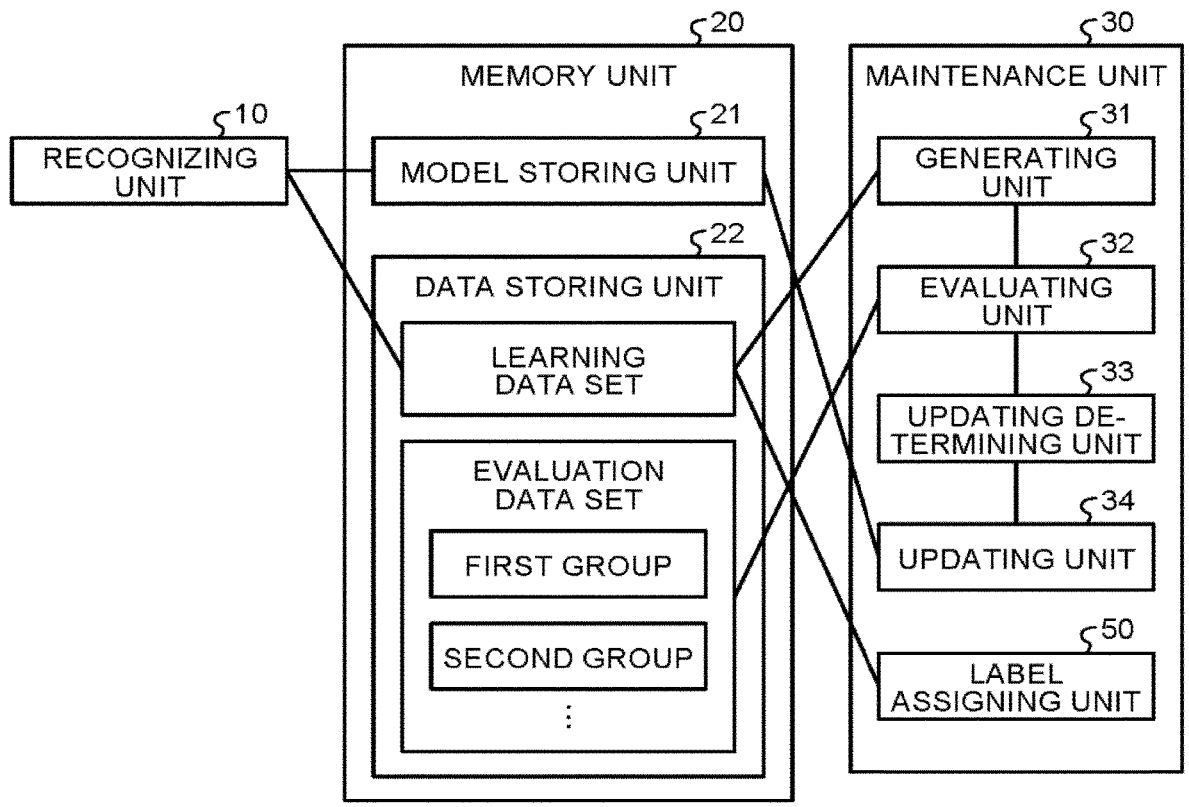
FIG. 11 is a block diagram illustrating an exemplary functional configuration of a pattern recognition system according to a third embodiment.

Given below is the explanation a third embodiment. In the third embodiment, a function is added for assigning a correct label to unsupervised data (the target data for recognition for which the label is assigned) included in the learning data set. FIG. 11 is a block diagram illustrating an exemplary functional configuration of a pattern recognition system according to the third embodiment. As compared to the configuration according to the first embodiment as illustrated in FIG. 4, in the pattern recognition system according to the third embodiment, the maintenance unit 30 further includes a label assigning unit 50.

Figure 12:
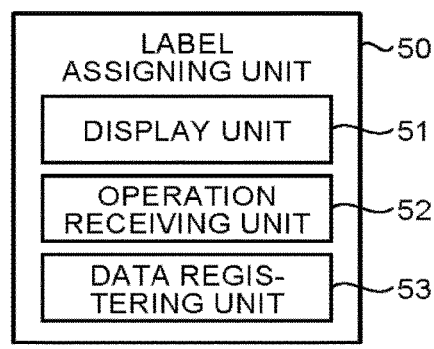
FIG. 12 is a block diagram illustrating the details of a label assigning unit.

The label assigning unit. 50 assigns, in response to teaching operation performed by the user, a correct label to the unsupervised data (the target data for recognition for which the label is estimated) included in the learning data set. The teaching operation is meant for teaching the correct label to the system. In FIG. 12 are illustrated the details of the label assigning unit 50. As illustrated in FIG. 12, the label assigning unit 50 includes a display unit 51, an operation receiving unit 52, and a data registering unit 53.

The display unit 51 performs control to display, in a display device, a variety of information that is useful for the user in performing a teaching operation. The operation receiving unit 52 receives a teaching operation performed by the user. According to the teaching operation of the user as received by the operation receiving unit 52, the data registering unit 53 stores, as supervised data in the data storing unit 22, the target data for recognition for which the correct label has been assigned.

Figure 13:
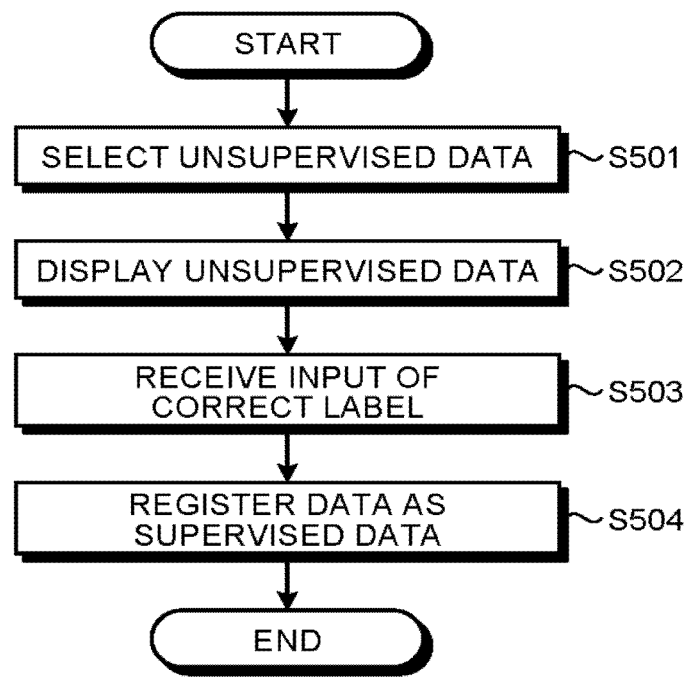
FIG. 13 is a flowchart for explaining a sequence of operations performed for label assignment.

FIG. 13 is a flowchart for explaining a sequence of operations performed for label assignment. For example, when the existing model stored in the model storing unit 21 is not updated for a predetermined period of time or more, label assignment is performed in response to a user request. That is, in the pattern recognition system according to the third embodiment, when the state in which the existing model stored in the model storing unit 21 is not updated for a predetermined period of time, a warning is issued to the user for prompting the user to perform a teaching operation. In response to the warning, the user requests the system for label assignment.

When the user requests for label assignment, the label assigning unit 50 is activated and, firstly, the display unit 51 selects unsupervised data representing the target for label assignment from among the unsupervised data included in the learning data set (Step S501), and displays information that enables the user to observe the selected unsupervised data (Step S502). At the time of selecting the unsupervised data, by selecting the unsupervised data having a small certainty factor for the recognition result, it is expected to have enhancement in the recognition accuracy of the new model generated at a latter stage. The information that enables the user to observe the selected unsupervised data implies the following: if the unsupervised data is an image, the information represents that image; or, if the unsupervised data is a voice, the information represents a voice replay button meant for replaying that voice. As a result of displaying such information, the user becomes able to observe the unsupervised data representing the target for label assignment. Meanwhile, the number of sets of unsupervised data representing the target for label assignment can be a predetermined number or can be decided according to the user input.

Subsequently, when the user, who has observed the unsupervised data representing the target for label assignment, inputs the correct label for the unsupervised data, the operation receiving unit 52 receives the input of the correct label (Step S503). Then, the data registering unit 53 associates the correct label, which is input by the user, with the unsupervised data representing the target for label assignment; and registers the data as supervised data in the data storing unit 22 (Step S504).

The abovementioned operations of the label assigning unit 50 end in response to a user operation. At that time, the teaching operation with respect to all sets of unsupervised data selected as the target for label assignment need not be completed. In the pattern recognition system according to the third embodiment, when the label assignment operation performed by the label assigning unit 50 is ended, the model maintenance either can be performed in continuation or can be performed at the next maintenance timing.

As described above, in the pattern recognition system according to the third embodiment, as a result of having the function of assigning the correct label to the unsupervised data included in the learning data set, in addition to become able to properly determine whether or not the existing model should be updated with the new model in an identical manner to the first embodiment, it also becomes possible to take proper measures when the performance of the new model does not improve and to generate a new model having improved performance.

Fourth Embodiment

Figure 14:
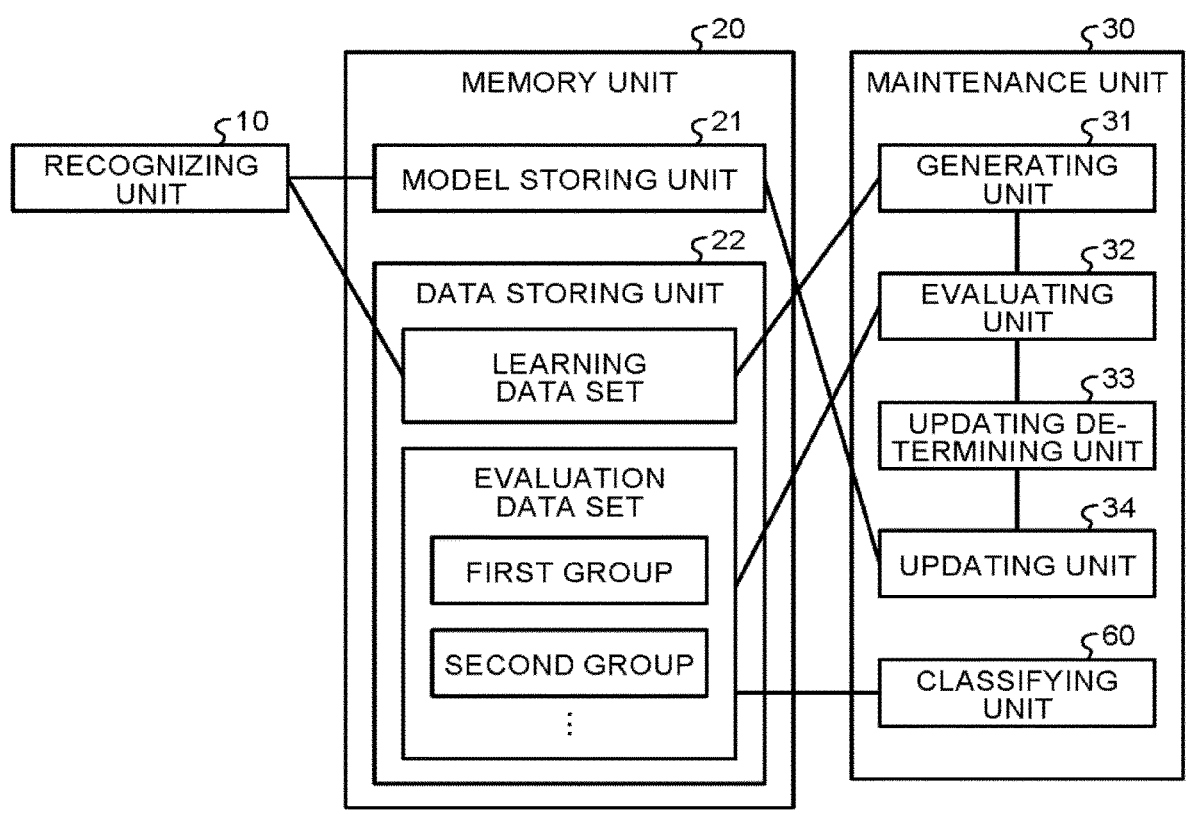
FIG. 14 is a block diagram illustrating an exemplary functional configuration of a pattern recognition system according to a fourth embodiment.

Given below is the explanation of a fourth embodiment. In the fourth embodiment, a function is added for automatically classifying the evaluation data set into a plurality of groups. FIG. 14 is a block diagram illustrating an exemplary functional configuration of a pattern recognition system according to the fourth embodiment. As compared to the configuration according to the first embodiment as illustrated in FIG. 4, in the pattern recognition system according to the fourth embodiment, the maintenance unit 30 further includes a classifying unit 60.

The classifying unit 60 automatically classifies the evaluation data, which is included in the evaluation data set, into a plurality of groups based on a predetermined classification criterion. For example, if the level of difficulty of recognition represents the classification criterion, then the classifying unit 60 calculates, for each set of evaluation data, a statistical amount indicating the level of difficulty of recognition using a predetermined method; and classifies the sets of evaluation data having the obtained value to be equal to or smaller than a threshold value into a first group and classifies the remaining sets of evaluation data into a second group. Examples of the method for calculating the statistical amount indicating the level of difficulty of recognition include the certainty factor in the case in which recognition is performed using a general-purpose model; and the distance from the cluster center in the case in which clustering (the X-means method or the Word method) is implemented.

Moreover, in a pattern recognition system for performing image recognition, if character recognition is the requested task, then the character types such as hiragana characters, katakana characters, kanji characters, numerals and symbols can be set as the classification criterion. Alternatively, if face recognition is the requested task, then the race can be set as the classification criterion. In that case, the classifying unit 60 can determine the character type and the race from the labels of the sets of evaluation data, and can classify the evaluation data into the corresponding groups.

Figure 15:
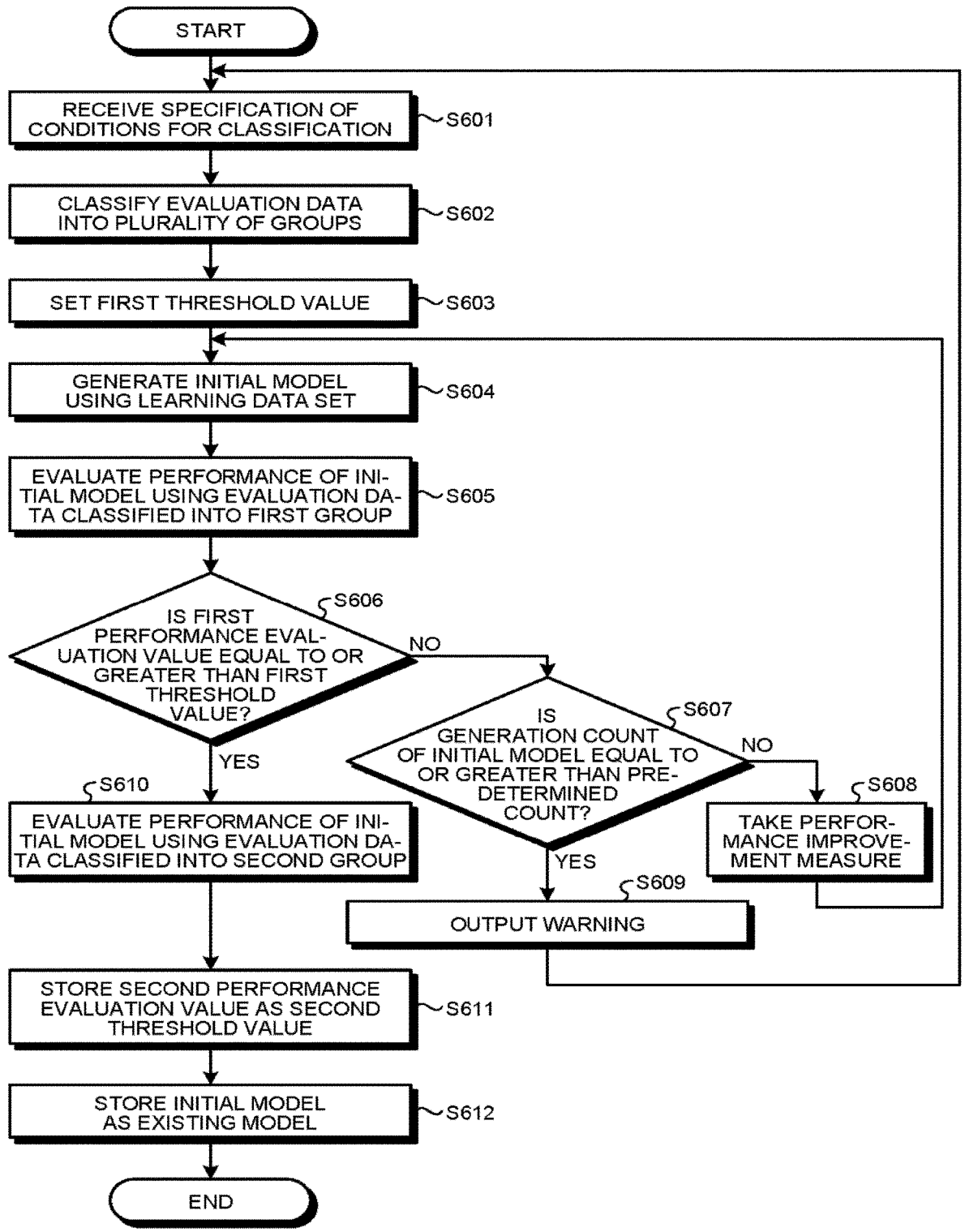
FIG. 15 is a flowchart for explaining a sequence of operations performed for initializing the model according to the fourth embodiment.

In the fourth embodiment, at the time of initializing the model, the classifying unit 60 automatically classifies the evaluation data into a plurality of groups. FIG. 15 is a flowchart for explaining a sequence of operations performed for initializing the model according to the fourth embodiment. As compared to the model initialization according to the first embodiment as illustrated in FIG. 5, the model initialization according to the fourth embodiment differs in the way of including additional operations of automatically classifying the evaluation data and setting the first threshold value before generating the initial model.

In the fourth embodiment, when the initialization of the model is started, firstly, the classifying unit 60 receives specification of the conditions for classification from the administrator (Step S601). Examples of the conditions for classification include the classification criterion and the first threshold value. Regarding the classification criterion, for example, candidates for classification criterion such as classification based on the level of difficulty, classification based on the character type, and classification based on the race can be presented, and the administrator can be allowed to select one of the candidates.

Then, according to the classification criterion specified at Step S601, the classifying unit 60 classifies the evaluation data, which is included in the evaluation data set, into a plurality of groups (Step S602); and sets the first threshold value specified at Step S601 (Step S603). The subsequent operations from Step S604 to Step S612 are identical to the operations from Step S101 to Step S109 illustrated in FIG. 5. Hence, the explanation of those operations is not repeated. However, in the fourth embodiment, after a warning is output at Step S609, the system control returns to Step S601 and a specification of conditions is again received from the administrator. At that time, for example, the administrator can perform operations such as changing the classification criterion to be specified and lowering the first threshold value.

As described above, in the pattern recognition system according to the fourth embodiment, as a result of having the function of automatically classifying the evaluation data into a plurality of groups, in addition to become able to properly determine whether or not the existing model should be updated with the new model in an identical manner to the first embodiment, it also becomes possible to eliminate the need of manually classifying the evaluation data thereby reducing the burden on the administrator.

Fifth Embodiment

Given below is the explanation of a fifth embodiment. In the fifth embodiment, the explanation is given for an example in which the evaluation data grouped into the first group is further classified into a plurality of subgroups. For example, in face recognition, in the case of classifying the evaluation data with the race representing the classification criterion, Asians are classified into a first group and the people of other races are classified into a second group. Moreover, the first group is further divided into country-by-county subgroups of Japanese people, Chinese people, Korean people, and so on. In that case, the evaluation data classified into the first group is further classified into the country-by-country subgroups.

When the evaluation data classified into the first group is to be further classified into a plurality of subgroups, the first threshold value is set for each subgroup of the first group. Then, the performance evaluation of the model using the evaluation data classified into the first group is performed for each subgroup so that the first performance evaluation value is calculated for each subgroup, and each first performance evaluation value is compared with the first threshold value set for the concerned subgroup. If the first performance evaluation value of each subgroup as calculated with respect to the new model is equal to greater than the first threshold value and if the second performance evaluation value is equal to or greater than the second threshold value, then it is determined that the existing model should be updated with the new model.

Meanwhile, not only the evaluation data classified into the first group can be further classified into a plurality of subgroups, but the evaluation data classified into the second group can also be further classified into a plurality of subgroups. For example, in character recognition, in the case of classifying the evaluation data with the character type representing the classification criterion, it is possible to think of an example in which hiragana characters are classified into a subgroup A of the first group, numerals are classified into a subgroup B of the first group, katakana characters are classified into a subgroup A of the second group, and alphabets are classified into a subgroup B of the second group. Meanwhile, it is also possible that only the evaluation data classified into the second group is further classified into a plurality of subgroups.

In the case in which the evaluation data classified into the second group is to be further classified into a plurality of subgroups, the performance evaluation of the model using the evaluation data classified into the second group is performed for each subgroup; the second performance evaluation value is calculated for each subgroup; and each second performance evaluation value is compared with the second threshold value set for the concerned subgroup (the second performance evaluation value calculated for each subgroup with respect to the existing model). If the first performance evaluation value calculated with respect to the new model is equal to or greater than the first threshold value (in the case in which the evaluation data classified into the first group is further classified into a plurality of subgroups, if the first performance evaluation value calculated for each subgroup is equal to or greater than the first threshold value set for that subgroup) and if the second performance evaluation value calculated for each subgroup is equal to or greater than the second threshold value, then it is determined that the existing model should be updated with the new model.

Meanwhile, the classification criterion that can be used in the fifth embodiment is not limited to the examples given above. Moreover, a single set of evaluation data can be classified into a plurality of subgroups. The classification of the evaluation data either can be performed manually in an identical manner to the first embodiment or can be performed automatically in an identical manner to the fourth embodiment.

As described above, in the fifth embodiment, the evaluation data classified into the first group or the evaluation data classified into the second group is further classified into a plurality of subgroups, and the first performance evaluation value or the second performance evaluation value is calculated for each subgroup. Hence, as the conditions for determining whether or not the existing model should be updated with the new model, conditions having a higher degree of freedom can be set, and thus a system capable of easily adapting to the environment can be designed.

Sixth Embodiment

Given below is the explanation of a sixth embodiment. In the sixth embodiment, the example is given in which the evaluation data is classified into a plurality of groups for each of a plurality of classification criteria. For example, in character recognition, assume that there is a user demand for accurate recognition of numerals. In that case, as a first classification criterion of the character type, numerals are classified into a first group based on the first classification criterion, and other characters are classified into a second group based on the first classification criterion. Moreover, by taking into account the practical importance, the level of difficulty of recognition is set as a second classification criterion; and the evaluation data having a low level of difficulty of recognition is classified into a first group, and the evaluation data having a high level of difficulty of recognition is classified into a second group. In that case, the evaluation data is classified into the first group and the second group according to the first classification criterion, as well as is classified into the first group and the second group according to the second classification criterion. Meanwhile, the classification criteria that can be used in the sixth embodiment are not limited to the example given above, and any mutually-combinable classification criteria can be used. The classification of the evaluation data either can be performed manually in an identical manner to the first embodiment or can be performed automatically in an identical manner to the fourth embodiment. Moreover, the number of classification criteria is not limited to too, and there can be three or more classification criteria. Furthermore, at least one of the first groups can be configured to have a plurality of subgroups in an identical manner to the fifth embodiment.

In the sixth embodiment, the first performance evaluation value and the second performance evaluation value with respect to the model are calculated for each of a plurality of classification criteria. Then, if the first performance evaluation value calculated with respect to the new model for each of the plurality of classification criteria is equal to or greater than the first threshold value and if the second performance evaluation value calculated with respect to the new model for each of the plurality of classification criteria is equal to or greater than the second threshold value, it is determined that the existing model should be updated with the new model. Meanwhile, regarding the first threshold value, either a different value can be set for each of the plurality of classification criteria, or a common value can be set across the classification criteria.

As described above, in the sixth embodiment, since the evaluation data is classified into a plurality of groups according to each of a plurality of classification criteria, conditions having a higher degree of freedom can be set as the conditions for determining whether or not the existing model should be updated with the new model, and thus a system capable of easily adapting to the environment can be designed.

Seventh Embodiment

Given below is the explanation of a seventh embodiment. In the seventh embodiment, the explanation is given for an example in which groups represent a fuzzy set. Herein, the fuzzy set represents an expression method in which it is not considered whether or not particular data belongs to a group hut the data is expressed as sequential numerical values using the degree of belongingness. That is, in the seventh embodiment, a plurality of groups used for the classification of evaluation data is sequentially expressed using the degree of belongingness to each group.

In the seventh embodiment, the degree of belongingness of the evaluation data with respect to the first group is defined, and the degree of belongingness of the evaluation data with respect to the second group is defined. For example, assume that the level of difficulty of recognition with respect to the evaluation data represents the classification criterion and assume that the evaluation data having a low level of difficulty of recognition is classified into the first group and the evaluation data having a high level of difficulty of recognition is classified into the second group. In that case, a certainty factor that is normalized to be equal to or greater than zero and to be equal to or smaller than one and that is obtained when the evaluation data is recognized using a general-purpose model can be set as the degree of belongingness with respect to the first group, and $(1-s)$ can be set as the degree of belongingness with respect to the second group. Moreover, assume that the degree of priority of the evaluation data represents the classification criterion and assume that the evaluation data having a high degree of priority is classified into the first group and the evaluation data having a low degree of priority is classified into the second group. In that case, a value p that is equal to or greater than zero and equal to or smaller than one and that becomes greater in inverse proportion of the numerical value indicating the order of priority assigned to each set of evaluation data can be set as the degree of belongingness with respect to the first group, and (1−p) can be set as the degree of belongingness with respect to the second group.

In the seventh embodiment, the performance evaluation with respect to the model is performed using all sets of evaluation data included in the evaluation data set. Then, the first performance evaluation value and the second performance evaluation value are calculated according to a predetermined method. For example, the first performance evaluation value can be calculated according to the weighted sum obtained by multiplying the degree of belongingness with respect to the first group to the value indicating whether or not each set of evaluation data could be recognized (for example, "1" when recognized and "0" when not recognized); and the second performance evaluation value can be calculated according to the weighted sum obtained by multiplying the degree of belongingness with respect to the second group to the value indicating whether or not each set of evaluation data could be recognized. Meanwhile, the method for determination of model updating is identical to the first embodiment.

As Described above, even if a plurality of groups used in classifying the evaluation data represents a fuzzy set expressed sequentially on the basis of the degree of belongingness with respect to each group, whether or not the existing model should be updated with the new model can be properly determined in an identical manner to the first embodiment.

Eighth Embodiment

Figure 16:
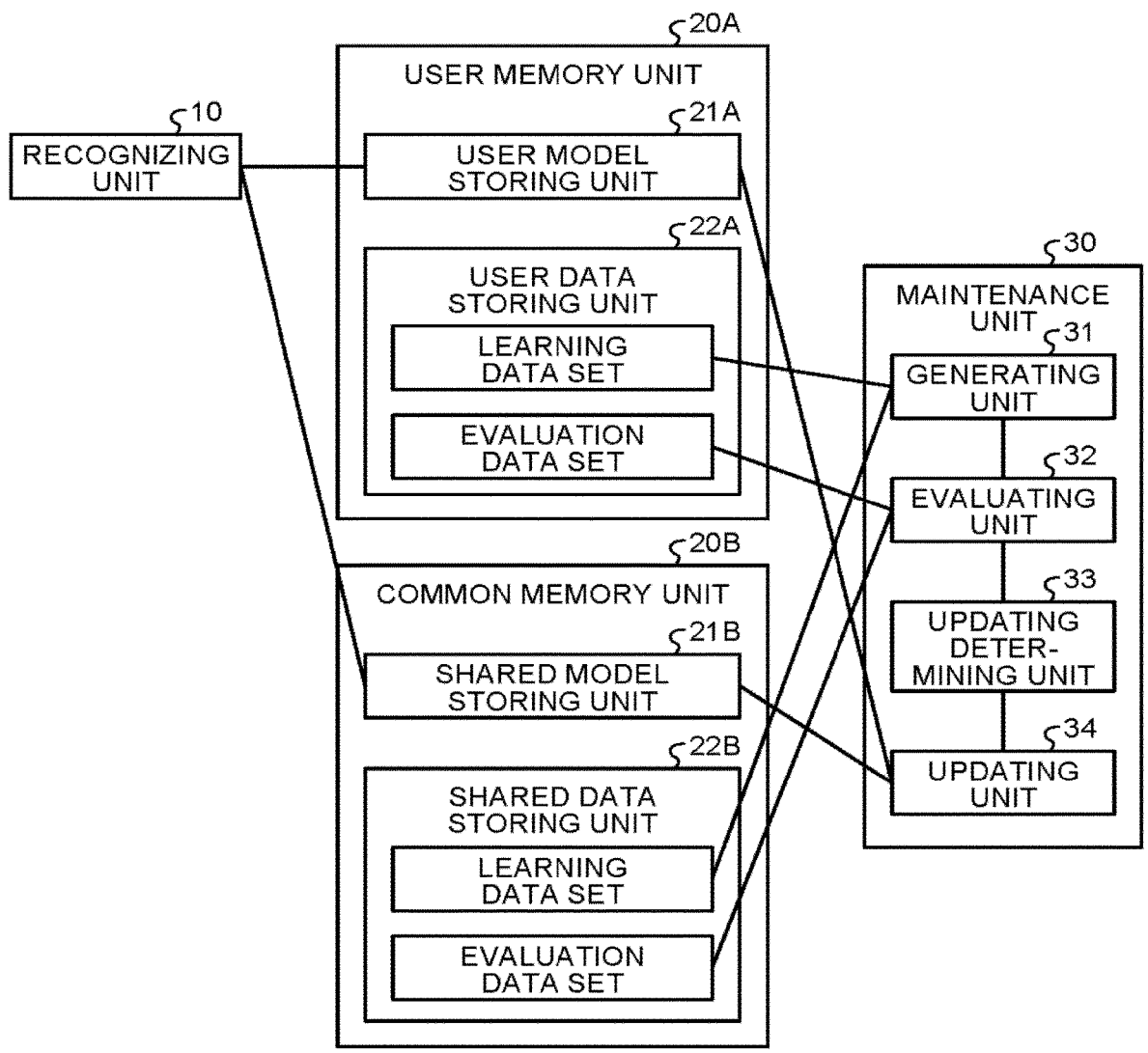
FIG. 16 is a block diagram illustrating an exemplary functional configuration of the pattern recognition system according to an eighth embodiment.

Given below is the explanation of an eighth embodiment. In the eighth embodiment, the explanation is given for an example in which, in addition to the model that is meant exclusively for the concerned user, a model shared among a plurality of users is also present. FIG. 16 is a block diagram illustrating an exemplary functional configuration of a pattern recognition system according to the eighth embodiment. As illustrated in FIG. 16, the pattern recognition system according to the eighth embodiment includes the recognizing unit 10, a user memory unit 20A, a common memory unit 20B, and the maintenance unit 30. In FIG. 16, although only a single recognizing unit 10 and a single user memory unit 20A are illustrated, the recognizing unit 10 and the user memory unit 20A are provided on a user-by-user basis.

The user memory unit 20A includes a user model storing unit 21A for storing the model meant exclusively for the concerned user, and includes a user data storing unit 22A for storing the learning data set and the evaluation data set meant exclusively for the concerned user. The common memory unit 20B includes a shared model storing unit 21B for storing the model shared among a plurality of users, and includes a shared data storing unit 22B for storing the learning data set and the evaluation data set shared among a plurality of users.

In the eighth embodiment, the initialization of the model meant exclusively for the concerned user and the initialization of the model shared among a plurality of users is separately performed according to the sequence of operations identical to the sequence of operations according to the first embodiment (see FIG. 5). Moreover, the model-based pattern recognition is performed according to a predetermined method and using the model meant exclusively for the concerned user and using the model shared among the plurality of users. Examples of the predetermined method include a method in which, if the result of label estimation performed for the target data for recognition using the model meant exclusively for the concerned user indicates that the label is rejected, the label for the target data for recognition is again estimated using the model shared among the plurality of users. Herein, rejection implies withholding the output of the recognition result if the recognition result has a low certainty factor.

Moreover, in the eighth embodiment, the maintenance unit 30 separately performs the maintenance of the model meant exclusively for the concerned user and the maintenance of the model shared among the plurality of users according to the sequence of operations identical to the sequence of operations according to the first embodiment (see FIG. 7). However, during the maintenance of the model meant exclusively for the concerned user, some portion of the learning data set stored in the shared data storing unit 22B can be used in generating a new model.

That is, at the time of performing maintenance of the model shared among the plurality of users, the maintenance unit 30 according to the eighth embodiment generates a new model using the learning data set stored in the shared data storing unit 22B; evaluates the performance of the new model using the evaluation data stored in the shared data storing unit 22B; and calculates the first performance evaluation value and the second performance evaluation value. Then, if the first performance evaluation value is equal to or greater than the first threshold value and if the second performance evaluation value is equal to or greater than the second threshold value, the existing model stored in the shared model storing unit 21B is updated with the new model.

Moreover, at the time of performing the maintenance of the model meant exclusively for the concerned user, the maintenance unit 30 according to the eighth embodiment generates a new model using the learning data set stored in the user data storing unit 22A as well as selectively using such learning data from the learning data set stored in the shared data storing unit 22B which has similar features to the learning data set stored in the user data storing unit 22A. For example, from the learning data set stored in the shared data storing unit 22B, such learning data is selected and used whose distance (closeness) from an arbitrary point or a representative point in the feature space of the learning data set stored in the user data storing unit 22A is within a predetermined range. Then, the maintenance unit 30 evaluates the performance of the new model using the evaluation data stored in the user data storing unit 22A and calculates the first performance evaluation value and the second performance evaluation value. If the first performance evaluation value is equal to or greater than the first threshold value and if the second performance evaluation value is equal to or greater than the second threshold value, the maintenance unit 30 updates the existing model, which is stored in the user model storing unit 21A, with the new model.

As described above, in the pattern recognition system according to the eighth embodiment, the maintenance of the model meant exclusively for the concerned user and the maintenance of the model shared among a plurality of users are performed according to the sequence of operations identical to the sequence of operations according to the first embodiment. Hence, whether or not the existing model should be updated with the new model can be properly determined regarding the model meant exclusively for the concerned user and regarding the model shared among a plurality of users. Moreover, in the eighth embodiment, at the time of performing the maintenance of the model meant exclusively for the concerned user, some portion of the learning data set stored in the shared data storing unit 22B is used in generating a new model. With that, a new model having a more enhanced performance can be generated.

Ninth Embodiment

Given below is the explanation a ninth embodiment. In the ninth embodiment, the explanation is given for an example of cross validation in which the performance of the model is evaluated while interchanging the learning data and the evaluation data. In the ninth embodiment, the learning data set and the evaluation data set are not explicitly distinguished, and each set of supervised data in the data storing unit 22 can be used as the learning data and as the evaluation data. Thus, the supervised data in the data storing unit 22 is classified into a plurality of groups.

In the ninth embodiment, as the preparation for model initialization, the data set of supervised data is divided and each set of supervised data is classified, and the first threshold value is set. That is, before building the pattern recognition system, a number of sets of supervised data are kept ready. Each set of supervised data is classified into a plurality of groups (the first group and the second group) according the classification criteria identical to the embodiments described above. Then, random equal division of the data set of supervised data is performed and N number of blocks are obtained and stored in the data storing unit 22, and the first threshold value is set. Herein, the greater then division count N, the more enhanced is the certainty factor of the performance evaluation of the model. However, the execution period of cross validation increases in proportion to the division count F. Meanwhile, the classification of the supervised data and the setting of the first threshold value are performed according to the judgement of the administrator, for example.

Figure 17:
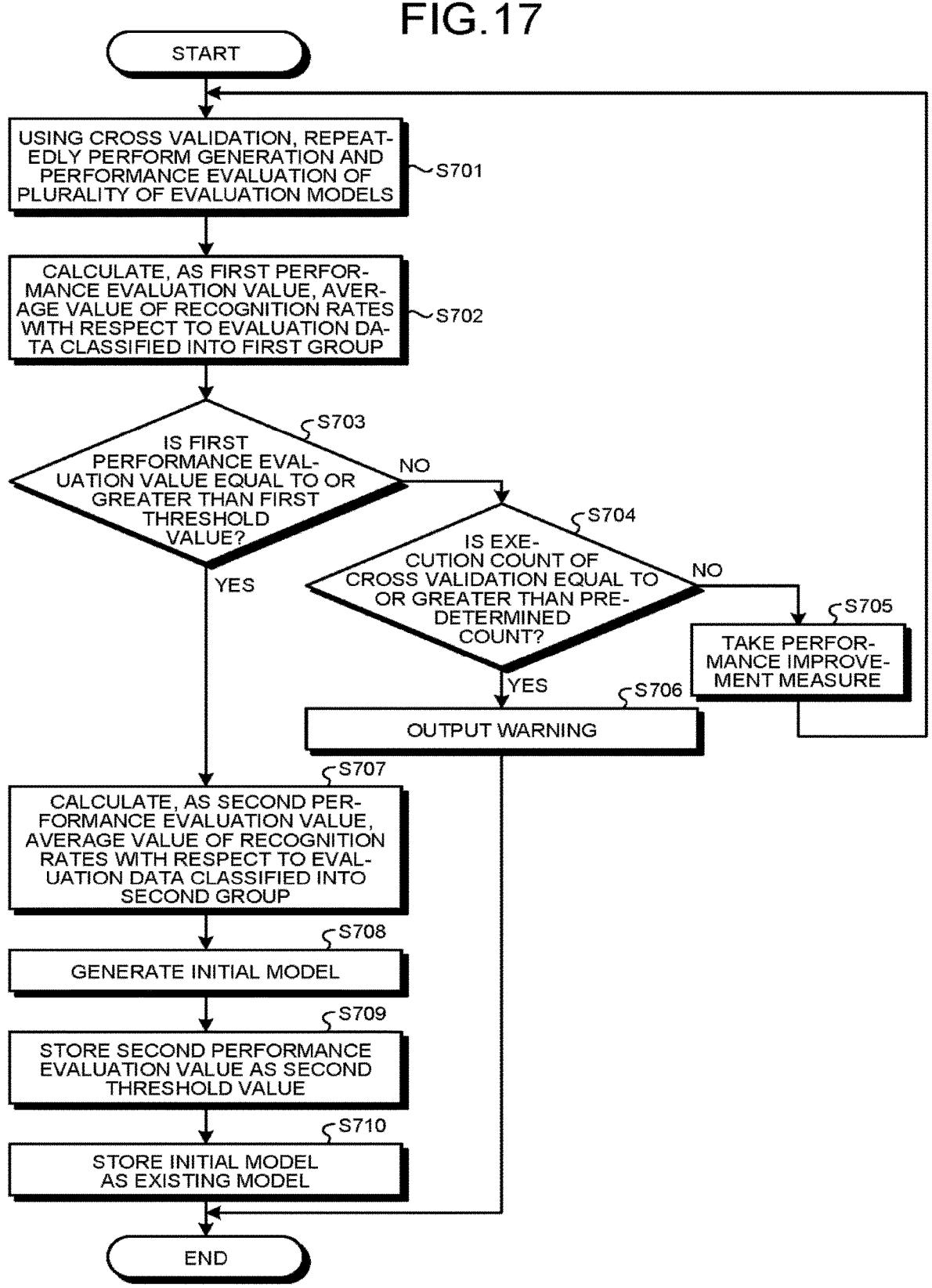
FIG. 17 is a flowchart for explaining a sequence of operations performed in the model initialization according to a ninth embodiment.

FIG. 17 is a flowchart for explaining a sequence of operations performed in the model initialization according to the ninth embodiment. In the ninth embodiment, when the model initialization is started, firstly, the generating unit 31 and the evaluating unit 32 perform cross validation using the data set of supervised data stored in the data storing unit 22. During the cross validation, of the data set of supervised data divided into N number of blocks, the first block is treated as the evaluation data and the remaining (N−1) number of blocks are treated as the learning data, and the generation of an evaluation model using the learning data and the performance evaluation of the evaluation model using the evaluation data are repeatedly performed for N number of times while sequentially changing the block to be used as the evaluation data. In the ninth embodiment, at the time of evaluating the performance of each evaluation model, the recognition rate with respect to the evaluation data classified into the first group is calculated separately from the calculation of the recognition rate with respect to the evaluation data classified into the second group (Step S701).

Then, the evaluating unit 32 calculates, as the first performance evaluation value, the average value of the recognition rates with respect to the evaluation data classified into the first group of the N number of evaluation models (Step S702). Subsequently, it is determined whether or not the first performance evaluation value equal to or greater than the first threshold value (Step S703). If the first performance evaluation value is smaller than the first threshold value (No at Step S703), it is further determined whether or not the execution count of cross validation is equal to or greater than a predetermined count (Step S704). If the execution count of cross validation is smaller than the predetermined count (No at Step S704), then a performance improvement measure is taken in an identical manner to the first embodiment (Step S705). Then, the system control returns to Step S701 and the cross validation is again performed. Meanwhile, if the execution count of cross validation is equal to or greater than the predetermined count (Yes at Step S704), then a warning is output in an identical manner to the first embodiment (Step S706). It marks the end of the initialization operation.

If the first performance evaluation value calculated at Step S703 is equal to or greater than the first threshold value (Yes at Step S703); then the evaluating unit 32 calculates, as the second performance evaluation value, the average value of the recognition rates with respect to the evaluation data classified into the second group of the N number of evaluation models (Step S707). Moreover, the generating unit 31 generates an initial model using the supervised data of all of the N number of blocks as the learning data (Step S708). Then, the second performance evaluation value calculated at Step S707 is stored as the second threshold value (Step S709), and the initial model generated at Step S708 is stored as the existing model in the model storing unit 21 (Step S710). It marks the end of the initialization operation.

Figure 18:
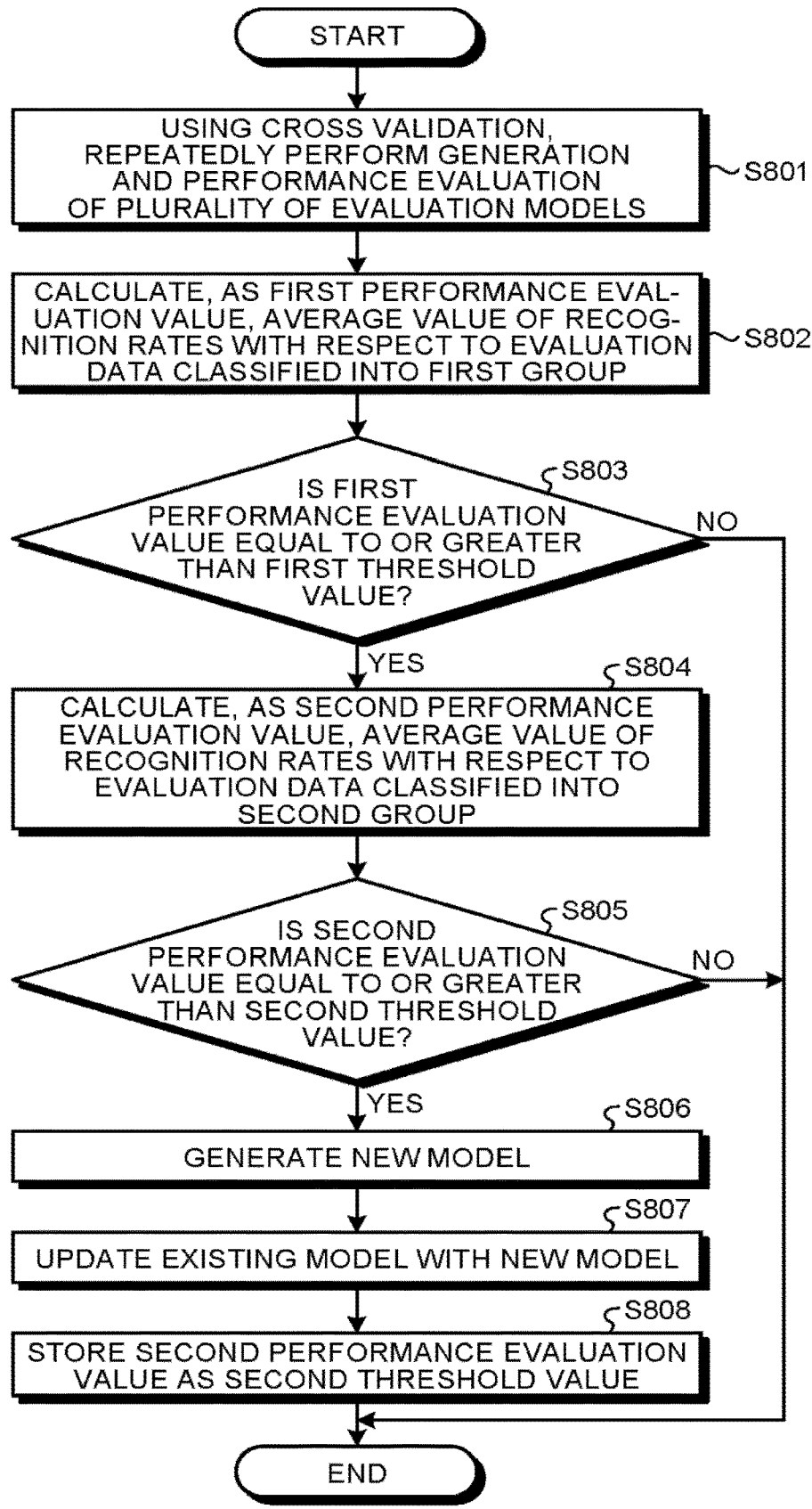
FIG. 18 is a flowchart for explaining a sequence of operations performed in the model maintenance according to the ninth embodiment.

FIG. 18 is a flowchart for explaining a sequence of operations performed in the model maintenance according to the ninth embodiment. When the model maintenance is started, in an identical manner to model initialization, the generating unit 31 and the evaluating unit 32 perform cross validation using the data set of supervised data stored in the data storing unit 22, and generation of N number of evaluation models and the performance evaluation of the evaluation models is performed in a repeated manner (Step S801). At the time of generating the N number of evaluation models according to cross validation, the unsupervised data stored in the data storing unit 22 can also be used in the learning in an identical manner to the method given earlier at Step S301.

Then, the evaluating unit 32 calculates, as the first performance evaluation value, the average value of the recognition rates with respect to the evaluation data classified into the first group of the N number of evaluation models (Step S802). Subsequently, it is determined whether or not the first performance evaluation value is equal to or greater than the first threshold value (Step S803). If the first performance evaluation value is smaller than the first threshold value (No at Step S603), then the updating determining unit 33 determines that the existing model should not be updated with the new model. It marks the end of the model maintenance.

If the first performance evaluation value is equal to or greater than the first threshold value (Yes at Step S803); then the evaluating unit 32 calculates, as the second performance evaluation value, the average value of the recognition rates with respect to the evaluation data classified into the second group of the N number of evaluation models (Step S804). Then, it is determined whether or not the second performance evaluation value is equal to or greater than the second threshold value (Step S805). If the second performance evaluation value is smaller than the second threshold value (No at Step S805), then the updating determining unit 33 determines that the existing model should not be updated with the new model. It marks the end of the model maintenance.

If the second performance evaluation value is equal to or greater than the second t value (Yes at Step S805), then the updating determining unit determines that the existing model should be updated with the new model. In that case, the generating unit 31 generates the new model using the supervised data of all of the N number of blocks as the learning data (Step S806). Then, the updating unit 34 updates the existing model with the new model generated at Step S806 (Step S807); and stores the second performance evaluation value, which is calculated at Step S804, as the second threshold value (Step S808). It marks the end of the model maintenance.

As described above, in the pattern recognition system according to the ninth embodiment, the performance of the model is evaluated according to cross validation. Hence, in addition to become able to properly determine whether or not the existing model should be updated with the new model in an identical manner to the first embodiment, it also becomes possible to enhance the effect of learning and to generate a new model having a more enhanced performance.

Supplementary Explanation

The pattern recognition system according to the embodiments can be implemented using, for example, a general-purpose computer as the fundamental hardware. That is, the functions of the constituent elements of the pattern recognition system can be implemented by making one or more processors installed in a general-purpose computer execute a computer program. At that time, the computer program either can be installed in advance in the computer, or can be installed in a computer-readable memory medium, or can be distributed via a network and can be installed in the computer when necessary.

Figure 19:
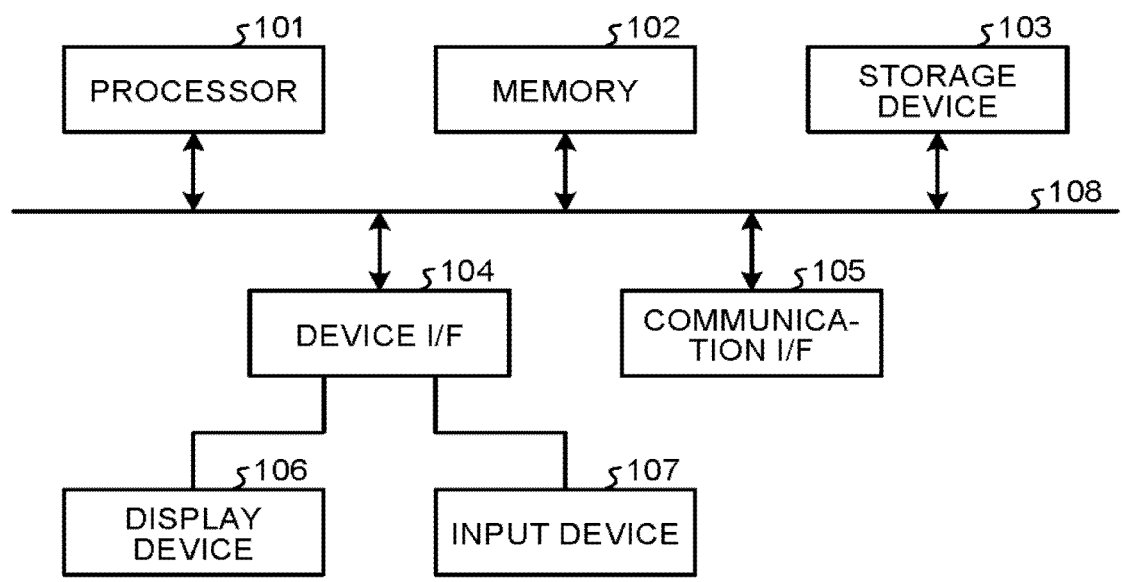
FIG. 19 is a block diagram illustrating an exemplary hardware configuration of the pattern recognition system.

FIG. 19 is a block diagram illustrating an exemplary hardware configuration of the pattern recognition system according to the embodiments described above. For example, as illustrated in FIG. 19, the pattern recognition system has the hardware configuration of a commonly-used computer that includes a processor 101 such as a central processing unit (CPU); a memory 102 such as a random access memory (RAM) or a read only memory (ROM); a storage device 103 such as a hard disk drive (HDD) or a solid state drive (SSD); a device interface (I/F) 104 that enables establishment of connection with devices such as a display device 106, such as a liquid crystal panel, and an input device 107, such as a keyboard or a pointing device; a communication I/F 105 that enables communication with the outside of the device; and a bus 108 that connects the constituent elements to each other.

In the case of implementing the pattern recognition system according to the embodiments using the hardware configuration illustrated in FIG. 19; for example, the processor 101 uses the memory 102, and reads and executes the computer program stored in the storage device 103, so that the functions of the recognizing unit 10 and the maintenance unit 3C (the generating unit 31, the evaluating unit 32, the updating determining unit 33, and the updating unit 34) can be implemented. Moreover, for example, the storage device 103 can be used to implement the functions of the memory unit 20 (the model storing unit 21 and the data storing unit 22).

Meanwhile, regarding the functions of the constituent elements of the pattern recognition system according to the embodiments, some or all of the functions can be implemented using dedicated hardware dedicated processor instead of a general-purpose processor) such as an application specific integrated circuit (ASIC) or a field-programmable gate array (FPGA). Alternatively, the functions of the constituent elements can be implemented using a plurality of processors.

Figure 20:
FIG. 20 is a block diagram illustrating an exemplary configuration of a pattern recognition system that includes a terminal and a server.

Meanwhile, the pattern recognition system according to the embodiments is not limited to be implemented using a single computer, and can be implemented by dispersing the functions among a plurality of computers. For example, as illustrated in FIG. 20, the pattern recognition system can be configured by connecting a terminal 110 of a user and a server 120 via a network 130. In that case, for example, the recognizing unit. 10 and the memory unit 20 can be provided in the terminal 110, and the maintenance unit 30 can be provided in the server 120. Alternatively, it is possible to think of a configuration in which the recognizing unit 10 is provided in the terminal 110, and the memory unit 20 and the maintenance unit 30 are provided in the server 120. Moreover, in the eighth embodiment, it is possible to think of a configuration in which the recognizing unit. 10 and the user memory unit 20A are provided in the terminal 110 of each of a plurality of users, and the common memory unit 203 and the maintenance unit 30 are provided in the server 120. However, in such cases, in order to ensure that the evaluating unit 32 can evaluate the performance of the models in the server 120, it is necessary that the server 120 is configured to have the functions equivalent to the recognizing unit 10.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A model maintenance device that performs maintenance of a model for pattern recognition used in label estimation of target data for recognition, the model maintenance device comprising:
a hardware processor connected to a memory and configured to function as:
a generating unit that generates a new model using learning data;
an evaluating unit that calculates a first performance evaluation value and a second performance evaluation value each for the new model,
the first performance evaluation value being calculated by evaluating performance of the new model using evaluation data classified into a first group in an evaluation data set, the first group containing specific type of data in the evaluation data set,
the second performance evaluation value being calculated by evaluating performance of the new model using evaluation data classified into a second group in the evaluation data set, the second group containing data other than the specific type of data in the evaluation data set; and
an updating determining unit that determines, based on the first performance evaluation value and the second performance evaluation value, whether or not an existing model should be updated with the new model.

2. The model maintenance device according to claim 1, wherein the hardware processor is further configured to function as an updating unit that, when the updating determining unit determines that updating should be done, updates the existing model with the new model.

3. The model maintenance device according to claim 1, wherein the hardware processor is further configured to function as an updating unit that, when the updating determining unit determines that updating should be done, makes an inquiry to user about whether or not to update the existing model with the new model and, when an updating instruction is received from the user, updates the existing model with the new model.

4. The model maintenance device according to claim 1, wherein the generating unit generates the new model using the learning data which contains target data for recognition for which a label has been estimated using the existing model.

5. The model maintenance device according to claim 4, wherein the hardware processor is further configured to function as a label assigning unit that, in response to a teaching operation performed by a user, assigns a correct label to the target data for recognition included in the learning data.

6. The model maintenance device according to claim 1, wherein, when the first performance evaluation value of the new model is equal to or greater than a first threshold value and when the second performance evaluation value of the new model is equal to or greater than a second threshold value, the updating determining unit determines that the existing model should be updated with the new model.

7. The model maintenance device according to claim 6, wherein
the first threshold value is a predetermined fixed value, and
the second threshold value is a second performance evaluation value of the existing model that was calculated and stored in the memory when the existing model was a new model.

8. The model maintenance device according to claim 6, wherein
evaluation data classified into the first group is further classified into a plurality of subgroups,
the evaluating unit calculates the first performance evaluation value for each subgroup, and
the updating determining unit compares the first performance evaluation value calculated for each subgroup with the first threshold value of concerned subgroup.

9. The model maintenance device according to claim 6, wherein
the evaluation data classified into the second group is further classified into a plurality of subgroups,
the evaluating unit calculates the second performance evaluation value for each subgroup, and
the updating determining unit compares the second performance evaluation value calculated for each subgroup with the second threshold value of concerned subgroup.

10. The model maintenance device according to claim 1, wherein the hardware processor is further configured to function as an editing unit that performs addition, deletion, and group transfer of the evaluation data in response to an editing operation performed by a user.

11. The model maintenance device according to claim 1, wherein the hardware processor is further configured to function as a classifying unit that classifies the evaluation data into the plurality of groups based on a predetermined classification criterion.

12. The model maintenance device according to claim 1, wherein
the evaluation data is classified into a plurality of groups for each of a plurality of classification criteria, and
the evaluating unit calculates the first performance evaluation value and the second performance evaluation value for each of the plurality of classification criteria.

13. The model maintenance device according to claim 1, wherein the plurality of groups is sequentially expressed based on degree of belongingness to each group.

14. The model maintenance device according to claim 1, wherein
the generating unit generates an evaluation model and the evaluating unit performs performance evaluation of the evaluation model in a repeated manner while switching between data used as the learning data and data used as the evaluation data in a data set,
the evaluating unit
performs, at time of evaluating performance of each of the evaluation models, performance evaluation using evaluation data classified into the first group separately from performance evaluation using evaluation data classified into the second group,
calculates the first performance evaluation value based on recognition rate with respect to evaluation data classified in the first group of each of the evaluation models, and
calculates the second performance evaluation value based on recognition rate with respect to evaluation data classified in the second group of each of the evaluation models, and
when it is determined that the existing model should be updated with the new model, the generating unit generates the new model using the data set as the learning data.

15. A pattern recognition system comprising:
a memory that stores an existing model; and
one or more hardware processors connected to the memory and configured to function as:
a recognizing unit that estimates a label of target data for recognition using the existing model;
a generating unit that generates a new model using learning data;
an evaluating unit that calculates a first performance evaluation value and a second performance evaluation value each for the new model,
the first performance evaluation value being calculated by evaluating performance of the new model using the evaluation data classified into a first group in an evaluation data set, the first group containing specific type of data in the evaluation data set,
the second performance evaluation value being calculated by evaluating performance of the new model using the evaluation data classified into a second group in the evaluation data set, the second group containing data other than the specific type of data in the evaluation data set; and
an updating determining unit that determines, based on the first performance evaluation value and the second performance evaluation value, determines whether or not the existing model stored in the memory should be updated with the new model.

16. The pattern recognition system according to claim 15, wherein
the pattern recognition system includes a terminal and a server connected via a network, the terminal and the server each including a different one of the hardware processors, the hardware processor of the terminal functions as at least the recognizing unit, and
the hardware processor of the server functions as at least the generating unit, the evaluating unit, and the updating determining unit.

17. The pattern recognition system according to claim 16, wherein
the memory includes
a user memory that stores a model, the learning data, and the evaluation data meant exclusively for a concerned user, and
a common memory that stores a model, the learning data, and the evaluation data shared among a plurality of users,
the terminal includes the user memory,
the server includes the common memory, and
the generating unit generates the new model meant exclusively for the concerned user using the learning data stored in the user memory and using learning data that is selected according to a predetermined criterion from the learning data stored in the common memory.

18. A model maintenance method for performing maintenance of a model for pattern recognition used in label estimation of target data for recognition, the model maintenance method comprising:
generating a new model using learning data;
calculating a first performance evaluation value and a second performance evaluation value each for the new model,
the first performance evaluation value being calculated by evaluating performance of the new model using evaluation data classified into a first group in an evaluation data set, the first group containing specific type of data in the evaluation data set,
the second performance evaluation value being calculated by evaluating performance of the new model using evaluation data classified into a second group in the evaluation data set, the second group containing data other than the specific type of data in the evaluation data set; and
determining, based on the first performance evaluation value and the second performance evaluation value, whether or not an existing model should be updated with the new model.

19. A computer program product having a non-transitory computer readable medium including programmed instructions, wherein the instructions, when executed by a computer, cause the computer to perform:
generating a new model using learning data;
calculating a first performance evaluation value and a second performance evaluation value each for the new model,
the first performance evaluation value being calculated by evaluating performance of the new model using evaluation data classified into a first group in an evaluation data set, the first group containing specific type of data in the evaluation data set,
the second performance evaluation value being calculated by evaluating performance of the new model using evaluation data classified into a second group in the evaluation data set, the second group containing data other than the specific type of data in the evaluation data set; and
determining, based on the first performance evaluation value and the second performance evaluation value, whether or not an existing model should be updated with the new model.

\* \* \* \* \*